(12) United States Patent  
Hill et al.

(10) Patent No.: US 6,693,615 B2
(45) Date of Patent: Feb. 17, 2004

(54) HIGH RESOLUTION DISPLAY OF IMAGE DATA USING PIXEL SUB-COMPONENTS

(75) Inventors: William Hill, Carnation, WA (US); Michael Duggan, Kirkland, WA (US); Leroy B. Keely, Jr., Portola Valley, CA (US); Gregory C. Hitchcock, Woodinville, WA (US); J. Turner Whitted, Pittsboro, NC (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/430,724

(22) Filed: May 6, 2003

(65) Prior Publication Data

US 2003/0193515 A1 Oct. 16, 2003

Related U.S. Application Data

(63) Continuation of application No. 09/191,181, filed on Nov. 13, 1998, now Pat. No. 6,577,291, which is a continuation-in-part of application No. 09/168,013, filed on Oct. 7, 1998, now Pat. No. 6,278,434.

(51) Int. Cl.[7] .................................................. G06G 3/36
(52) U.S. Cl. ............................... 345/89; 345/87; 345/88
(58) Field of Search .............................. 345/87, 88, 89, 345/90, 432, 439; 348/473, 589, 600, 751

(56) References Cited

U.S. PATENT DOCUMENTS 6,232,947 B1 * 5/2001 Miyawaki et al. ............. 345/99
6,278,434 B1 * 8/2001 Hill et al. ................... 345/660
6,577,291 B2 * 6/2003 Hill et al. ..................... 345/89

* cited by examiner

Primary Examiner—Vijay Shankar
(74) Attorney, Agent, or Firm—Workman Nydegger

(57) ABSTRACT

Displaying image data with sub-pixel precision on display devices having pixels with separately controllable pixel sub-components, such as those used in liquid crystal display devices. Samples of the image data are obtained, and spatially different sets of one or more of the samples are mapped to individual pixel sub-components as opposed to mapping sets of samples to entire pixels. Luminous intensity values based on the mapped sets of samples are generated and used to control the operation of the separately controllable pixel sub-components. The image is thereby displayed on the display device, with different portions of the image being represented by different pixel sub-components, resulting an image with sub-pixel resolution. The image data can represent a text character, in which case the stem width of a stem of the text character can have a value that is not an integer multiple of the width of a full pixel.

24 Claims, 23 Drawing Sheets

HIGH RESOLUTION DISPLAY OF IMAGE DATA USING PIXEL SUB-COMPONENTS

RELATED APPLICATIONS

This application is a continuation of U.S. patent application Ser. No. 09/191,181, filed Nov. 13, 1998, now U.S. Pat. No. 6,577,291 which is a continuation-in-part of U.S. patent application Ser. No. 09/168,013, filed Oct. 7, 1998, now issued as U.S. Pat. No. 6,278,434, both of which are incorporated herein by reference.

BACKGROUND OF THE INVENTION

1. The Field of the Invention

The present invention relates to methods and apparatus for displaying images, and more particularly, to display methods and apparatus which display an image by representing different portions of the image on each of multiple pixel sub-components, rather than on entire pixels.

2. Background of the Invention

Color display devices have become the principal display devices of choice for most computer users. The display of color on a monitor is normally achieved by operating the display device to emit light, e.g., a combination of red, green, and blue light, which results in one or more colors being perceived by the human eye.

In cathode ray tube (CRT) display devices, the different colors of light are generated via the use of phosphor coatings which may be applied as dots in a sequence on the screen of the CRT. A different phosphor coating is normally used to generate each of the three colors, red, green, and blue resulting in repeating sequences of phosphor dots which, when excited by a beam of electrons will generate the colors red, green and blue.

The term pixel is commonly used to refer to one spot in, e.g., a rectangular grid of thousands of such spots. The spots are individually used by a computer to form an image on the display device. For a color CRT, where a single triad of red, green and blue phosphor dots cannot be addressed, the smallest possible pixel size will depend on the focus, alignment and bandwidth of the electron guns used to excite the phosphors. The light emitted from one or more triads of red, green and blue phosphor dots, in various arrangements known for CRT displays, tend to blend together giving, at a distance, the appearance of a single colored light source.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

FIG. 1 illustrates a known portable computer 100, which comprises a housing 101, a disk drive 105, keyboard 104 and a flat panel display 102.

Portable personal computers 100 tend to use liquid crystal displays (LCD) or other flat panel display devices 102, as opposed to CRT displays. This is because flat panel displays tend to be small and light weight as compared to CRT displays. In addition, flat panel displays tend to consume less power than comparably sized CRT displays making them better suited for battery powered applications than CRT displays.

A the quality of flat panel color displays continues to increase and their cost decreases, flat panel displays are beginning to replace CRT displays in desktop applications. Accordingly, flat panel displays, and LCDs in particular, are becoming ever more common.

Over the years, most image processing techniques, including the generation and display of fonts, e.g., sets of characters, on computer screens, have been developed and optimized for display on CRT display devices.

Unfortunately, existing text display routines fail to take into consideration the unique physical characteristics of flat panel display devices. These physical characteristics differ considerably from the characteristics of CRT devices particularly in regard to the physical characteristics of the RGB color light sources.

Color LCD displays are exemplary of display devices which utilize multiple distinctly addressable elements, referred to herein as pixel sub-elements or pixel sub-components, to represent each pixel of an image being displayed. Normally, each pixel on a color LCD display is represented by a single pixel element which usually comprises three non-square elements, i.e., red, green and blue (RGB) pixel sub-components. Thus, a set of RGB pixel sub-components together make up a single pixel element. LCD displays of the known type comprise a series of RGB pixel sub-components which are commonly arranged to form stripes along the display. The RGB stripes normally run the entire length of the display in one direction. The resulting RGB stripes are sometimes referred to as "RGB striping". Common LCD monitors used for computer applications, which are wider than they are tall, tend to have RGB stripes running in the vertical direction.

FIG. 2A illustrates a known LCD screen 200 comprising a plurality of rows (R1–R12) and columns (C1–C16) which may be used as the display 102. Each row/column intersection forms a square which represents one pixel element. FIG. 2B illustrates the upper left hand portion of the known display 200 in greater detail.

Note in FIG. 2B how each pixel element, e.g., the (R1, C4) pixel element, comprises three distinct sub-element or sub-components, a red sub-component 206, a green sub-component 207 and a blue sub-component 208. Each known pixel sub-component 206, 207, 208 is ⅓ or approximately ⅓ the width of a pixel while being equal, or approximately equal, in height to the height of a pixel. Thus, when combined, the three ⅓ width pixel sub-components 206, 207, 208 form a single pixel element.

As illustrated in FIG. 2A, one known arrangement of RGB pixel sub-components 206, 207, 208 form what appear to be vertical color stripes down the display 200. Accordingly, the arrangement of ⅓ width color sub-components 206, 207, 208, in the known manner illustrated in FIGS. 2A and 2B, is sometimes called "vertical striping".

While only 12 rows and 16 columns are shown in FIG. 2A for purposes of illustration, common column×row ratios include, e.g., 640×480, 800×600, and 1024×768. Note that known display devices normally involve the display being arranged in landscape fashion, i.e., with the monitor being wider than it is high as illustrated in FIG. 2A, and with stripes running in the vertical direction.

LCDs are manufactured with pixel sub-components arranged in several additional patterns including, e.g., zig-zags and a delta pattern common in camcorder view finders. While features of the present invention can be used with such pixel sub-component arrangements, since the RGB striping configuration is more common, the exemplary embodiments of the present invention will be explained in the context of using RGB striped displays.

Traditionally, each set of pixel sub-components for a pixel element is treated as a single pixel unit. Accordingly, in known systems luminous intensity values for all the pixel sub-components of a pixel element are generated from the same portion of an image. Consider for example, the image represented by the grid 220 illustrated in FIG. 2C. In FIG. 2C each square represents an area of an image which is to be represented by a single pixel element, e.g., a red, green and blue pixel sub-component of the corresponding square of the grid 230. In FIG. 2C a shaded circle is used to represent a single image sample from which luminous intensity values are generated. Note how a single sample 222 of the image 220 is used in known systems to generate the luminous intensity values for each of the red, green, and blue pixel sub-components 232, 233, 234. Thus, in known systems, the RGB pixel sub-components are generally used as a group to generate a single colored pixel corresponding to a single sample of the image to be represented.

The light from each pixel sub-component group effectively adds together to create the effect of a single color whose hue, saturation, and intensity depend on the value of each of the three pixel sub-components. Say, for example, each pixel sub-component has a potential intensity of between 0 and 255. If all three pixel sub-components are given 255 intensity, the eye perceives the pixel as being white. However, if all three pixel sub-components are given a value turning off each of the three pixel sub-components, the eye perceives a black pixel. By varying the respective intensities of each pixel sub-component, it is possible to generate millions of colors in between these two extremes.

Since, in the known system a single sample is mapped to a triple of pixel sub-components which are each ⅓ of a pixel in width, spatial displacement of the left and right pixel sub-components occurs since the centers of these elements are ⅓ from the center of the sample.

Consider for example that an image to be represented was a red cube with green and blue components equal to zero. As a result of the displacement between the sample and green image sub-component, when displayed on an LCD display of the type illustrated in FIG. 2A, the apparent position of the cube on the display will be shifted ⅓ of a pixel to the left of its actual position. Similarly, a blue cube would appear to be displaced ⅓ of a pixel to the right. Thus, known imaging techniques used with LCD screens can result in undesirable image displacement errors.

Text characters represent one type of image which is particularly difficult to accurately display given typical flat panel display resolutions of 72 or 96 dots (pixels) per inch (dpi). Such display resolutions are far lower than the 600 dpi supported by most printers and the even higher resolutions found in most commercially printed text such as books and magazines.

Because of the relatively low display resolution of most video display devices, not enough pixels are available to draw smooth character shapes, especially at common text sizes of 10, 12, and 14 point type. At such common text rendering sizes, gradations between different sizes and weights, e.g., the thickness, of the same typeface, are far coarser than their print equivalent.

The relatively coarse size of standard pixels tends to create aliasing effects which give displayed type characters jagged edges. For example, the coarse size of pixels tends to result in the squaring off of serifs, the short lines or ornaments at the ends, e.g., bottom, of strokes which form a typeface character. This makes it difficult to accurately display many highly readable or ornamental typefaces which tend to use serifs extensively.

Such problems are particularly noticeable in the stems, e.g., thin vertical portions, of characters. Because pixels are the minimum display unit of conventional monitors, it is not possible to display stems of characters using conventional techniques with less than one pixel stem weight. Furthermore, stem weight can only be increased a pixel at a time. Thus, stem weights leap from one to two pixels wide. Often one pixel wide character stems are too light, while two pixel wide character stems are too bold. Since creating a boldface version of a typeface on a display screen for small characters involves going from a stem weight of one pixel to two pixels, the difference in weight between the two is 100%. In print, bold might typically be only 20 or 30 percent heavier than its equivalent regular or Roman face. Generally, this "one pixel, two pixel" problem has been treated as an inherent characteristic of display devices which must simply be accepted.

Prior work in the field of displaying characters has focused, in part, on the development of anti-aliasing technologies designed to improve the display of characters on CRT displays. A commonly used anti-aliasing technique involves using shades of gray for pixels which include edges of the character. In effect, this smudges shapes, reducing spatial frequency of the edges but better approximating the intended character shapes. While known anti-aliasing techniques can significantly improve the quality of characters displayed on a CRT display device, many of these techniques are ineffective when applied to LCD display devices which differ considerably from CRT displays in terms of pixel sub-component arrangement.

While anti-aliasing techniques have helped the aliasing problem associated with displaying relatively low resolution representations of text, at least on CRT displays, the problem of pixel size and the inability to accurately display character stem widths have, prior to the present invention, been considered a fixed characteristic of display devices which must be tolerated.

In view of the above, it is apparent that there is a need for new and improved methods and apparatus for displaying text on flat panel display devices. It is desirable that at least some of the new methods be suitable for use with existing display device and computers. It is also desirable that at least some methods and apparatus be directed to improving the quality of displayed text on new computers using, e.g., new display devices and/or new methods of displaying text.

While the display of text, which is a special case of graphics, is of major concern in many computer applications, there is also a need for improved methods and apparatus for displaying other graphics, geometric shapes, e.g., circles, squares, etc., and captured images such as photographs, accurately and clearly.

SUMMARY OF THE INVENTION

The present invention is directed to methods and apparatus for displaying an image by representing different portions of the image on each of multiple pixel sub-components, rather than on entire pixels.

The inventors of the present application recognize the well-known principle that human eyes are much more sensitive to edges of luminance, where light intensity changes, than to edges of chrominance, where color intensity changes. This is why it is very difficult to read red text on a green background, for example. They also recognize the well-known principle that the eye is not equally sensitive to the colors of red, green and blue. In fact, of 100 percent luminous intensity in a fully white pixel the red pixel sub-component contributes approximately 30% to the overall perceived luminance, green 60% and blue 10%.

Various features of the present invention are directed to utilizing the individual pixel sub-components of a display as independent luminous intensity sources thereby increasing the effective resolution of a display by as much as a factor of 3 in the dimension perpendicular to the direction of the RGB striping. This allows for a significant improvement in visible resolution.

While the methods of the present invention may result in some degradation in chrominance quality as compared to known display techniques, as discussed above the human eye is more sensitive to edges of luminance than of chrominance. Accordingly, the present invention can provide significant improvements in the quality of images, compared to known rendering techniques, even when taking into consideration the negative impact the techniques of the present invention may have on color quality.

As discussed above, known monitors tend to use vertical striping. Because character stems occur in the vertical direction the ability to accurately control the thickness of vertical lines when rendering horizontally flowing text tends to be more important than the ability to control the thickness of horizontal lines.

With this in mind, it was concluded that, at least for text applications, it is often more desirable to have a monitor's maximum resolution in the horizontal, as opposed to vertical direction. Accordingly, various display devices implemented in accordance with the present invention utilize vertical, as opposed to horizontal, RGB striping. This provides such monitors, when used in accordance with the present invention, greater resolution in the horizontal direction than in the vertical direction. The present invention can however be applied similarly to monitors with horizontal RGB striping resulting in improved resolution in the vertical direction as compared to conventional image rendering techniques.

In addition to new display devices which are suitable for use when treating pixel sub-components as independent luminous intensity sources, the present invention is directed to new and improved text, graphics and image rendering techniques which facilitate pixel sub-component use in accordance with the present invention.

The display of images, including text, involves steps that include scan conversion. Scan conversion is the process by which geometric representations of images are converted into bitmaps. Scan conversion operations of the present invention involve mapping different portions of an image into different pixel sub-components. This differs significantly from known scan conversion techniques where the same portion of an image is used to determine the luminous intensity values to be used with each of the three pixel sub-components which represent a pixel.

The scan conversion operations of the invention can be used with other operations, including image scaling, hinting, and color processing operations, that take into consideration pixel sub-component boundaries within an image and the separately controllable nature of pixel sub-components of flat panel display devices.

Numerous additional features, embodiments, and advantages of -the methods and apparatus of the present invention are set forth in the detailed description which follows.

BRIEF DESCRIPTION OF THE DRAWINGS

FIG. 7C illustrates a display screen implemented in accordance with another embodiment of the present invention.

FIG. 16 illustrates how the character of FIG. 15 would be illustrated using known techniques.

FIGS. 17–20 illustrate different ways of illustrating the character shown in FIG. 15 in accordance with various text rendering techniques of the present invention.

DETAILED DESCRIPTION OF THE PREFERRED EMBODIMENTS

As discussed above, the present invention is directed to methods and apparatus for displaying images, e.g., text and/or graphics, on display devices by representing different portions of the image on each of multiple pixel sub-components, rather than on entire pixels.

Various methods of the present invention are directed to using each pixel sub-component as a separate independent luminous intensity source as opposed to treating the set of RGB pixel sub-components which comprise a pixel as a single luminous intensity unit. This allows for a display device with RGB horizontal or vertical striping to be treated as having an effective resolution in the dimension perpendicular to the direction of the striping that is up to 3 times greater than in the dimension of the striping. Various apparatus of the present invention are directed to display devices and control apparatus which take advantage of the ability to individually control pixel sub-components.

A. Exemplary Computing and Hardware Environments

Figure 5:
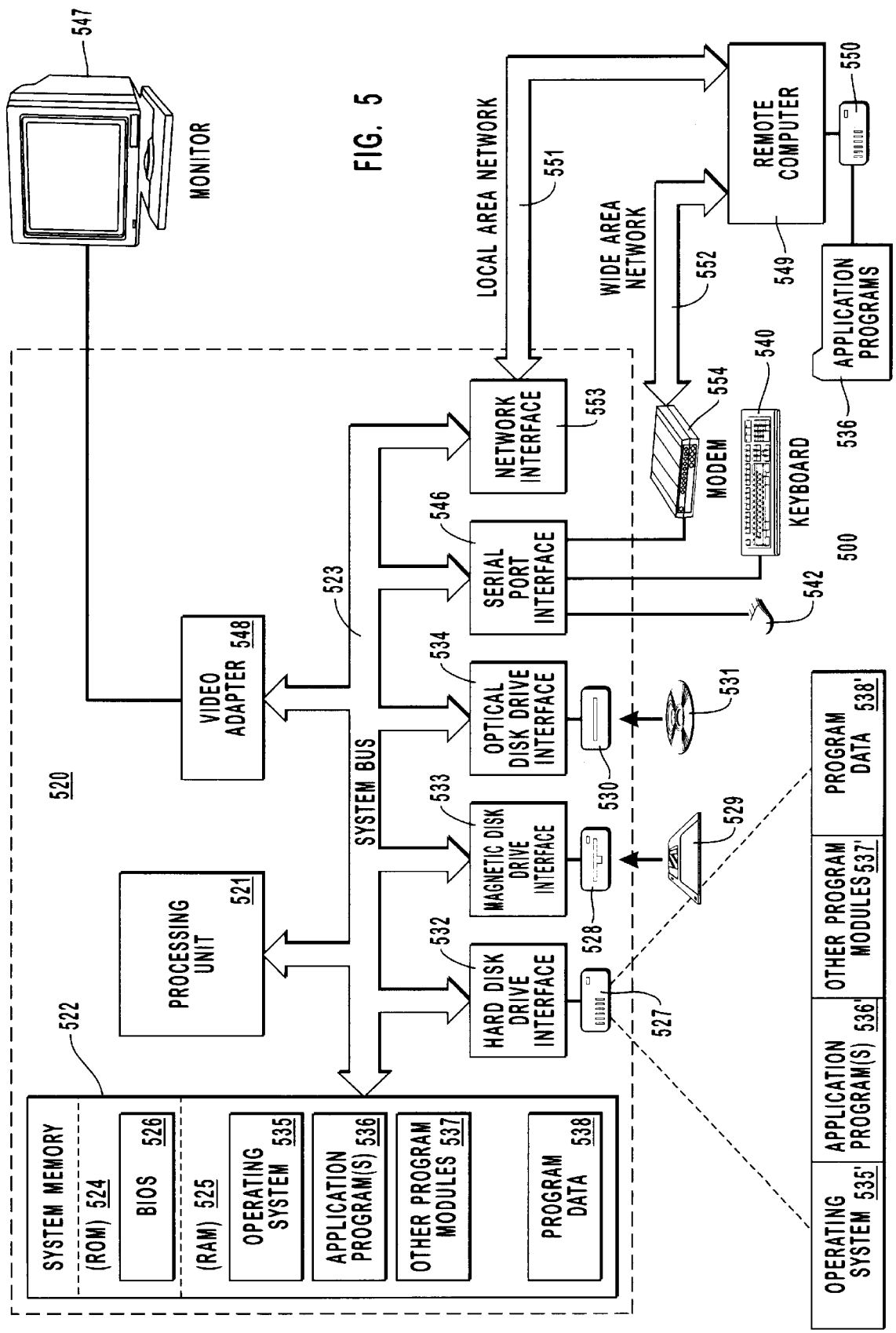
FIG. 5 illustrates a computer system implemented in accordance with the present invention.

FIG. 5 and the following discussion provide a brief, general description of an exemplary apparatus in which at least some aspects of the present invention may be implemented. Various methods of the present invention will be described in the general context of computer-executable instructions, e.g., program modules, being executed by a computer device such as a personal computer. Other aspects of the invention will be described in terms of physical hardware such as, e.g., display device components and display screens.

The methods of the present invention may be effected by other apparatus than the specific described computer devices. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 5, an exemplary apparatus 500 for implementing at least some aspects of the present invention includes a general purpose computing device. The personal computer 520 may include a processing unit 521, a system memory 522, and a system bus 523 that couples various system components including the system memory to the processing unit 521. The system bus 523 may be any of several types of bus structures including a memory bus or memory controller, a peripheral bus, and a local bus using any of a variety of bus architectures. The system memory may include read only memory (ROM) 524 and/or random access memory (RAM) 525. A basic input/output system 526 (BIOS), including basic routines that help to transfer information between elements within the personal computer 520, such as during start-up, may be stored in ROM 524. The personal computer 520 may also include a hard disk drive 527 for reading from and writing to a hard disk, (not shown), a magnetic disk drive 528 for reading from or writing to a (e.g., removable) magnetic disk 529, and an optical disk drive 530 for reading from or writing to a removable (magneto) optical disk 531 such as a compact disk or other (magneto) optical media. The hard disk drive 527, magnetic disk drive 528, and (magneto) optical disk drive 530 may be coupled with the system bus 523 by a hard disk drive interface 532, a magnetic disk drive interface 533, and a (magneto) optical drive interface 534, respectively. The drives and their associated storage media provide nonvolatile storage of machine readable instructions, data structures, program modules and other data for the personal computer 520. Although the exemplary environment described herein employs a hard disk, a removable magnetic disk 529 and a removable optical disk 531, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 523, magnetic disk 529, (magneto) optical disk 531, ROM 524 or RAM 525, such as an operating system 535, one or more application programs 536, other program modules 537, and/or program data 538 for example. A user may enter commands and information into the personal computer 520 through input devices, such as a keyboard 540 and pointing device 542 for example. Other input devices (not shown) such as a microphone, joystick, game pad, satellite dish, scanner, or the like may also be included. These and other input devices are often connected to the processing unit 521 through a serial port interface 546 coupled to the system bus. However, input devices may be connected by other interfaces, such as a parallel port, a game port or a universal serial bus (USB). A monitor 547 or other type of display device may also be connected to the system 523 via an interface, such as a video adapter 548 for example. In addition to the monitor 547, the personal computer 520 may include other peripheral output devices (not shown), such as speakers and printers for example.

The personal computer 520 may operate in a networked environment which defines logical connections to one or more remote computers, such as a remote computer 549. The remote computer 549 may be another personal computer, a server, a router, a network PC, a peer device or other common network node, and may include many or all of the elements described above relative to the personal computer 520. The logical connections depicted in FIG. 5 include a local area network (LAN) 551 and a wide area network (WAN) 552, an intranet and the Internet.

When used in a LAN, the personal computer 520 may be connected to the LAN 551 through a network interface adapter (or "NIC") 553. When used in a WAN, such as the Internet, the personal computer 520 may include a modem 554 or other means for establishing communications over the wide area network 552. The modem 554, which may be internal or external, may be connected to the system bus 523 via the serial port interface 546. In a networked environment, at least some of the program modules depicted relative to the personal computer 520 may be stored in the remote memory storage device. The network connections shown are exemplary and other means of establishing a communications link between the computers may be used.

Figure 7A:
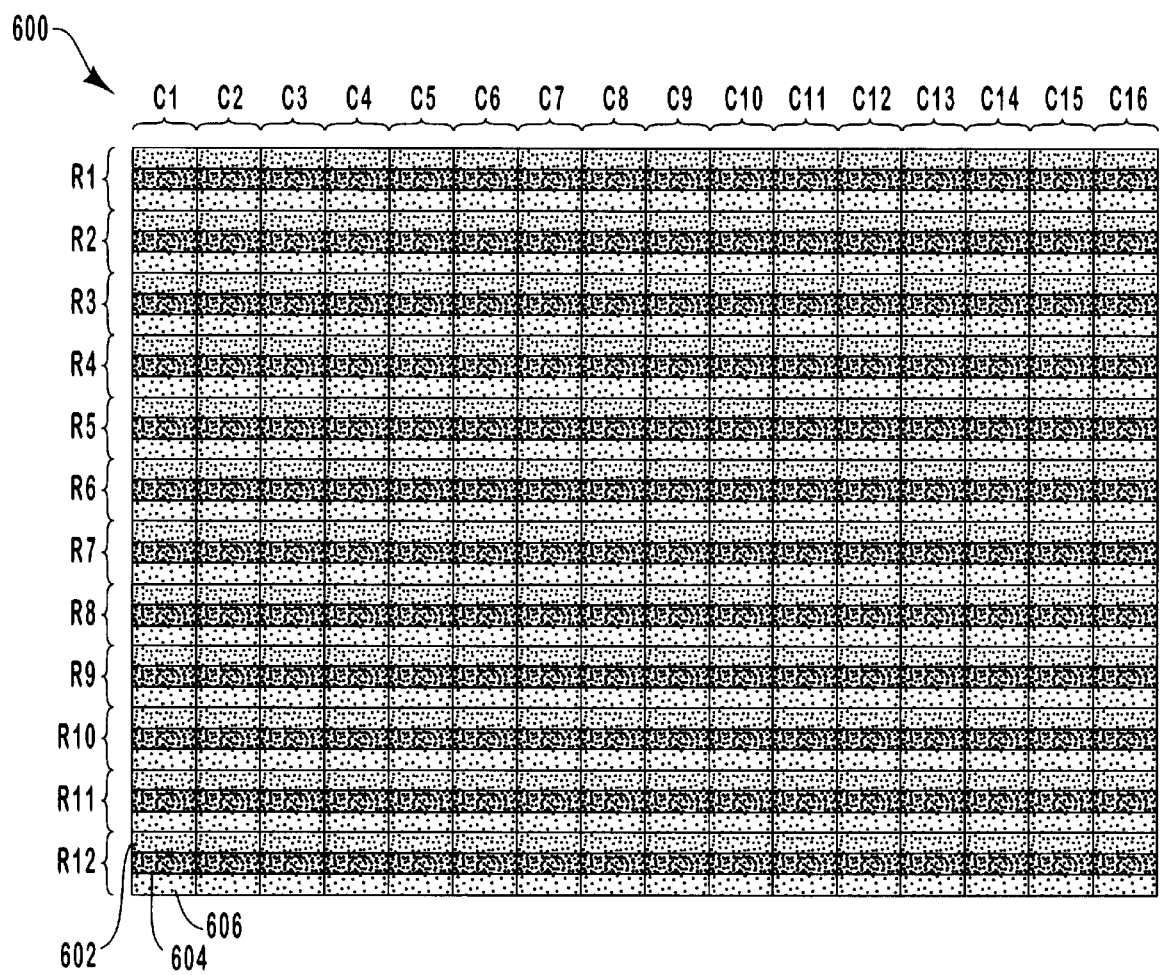
FIG. 7A illustrates a color flat panel display screen implemented in accordance with the present invention.

FIG. 7A illustrates a display device 600 implemented in accordance with an embodiment of the present invention. The display device 600 is suitable for use in, e.g., portable computers or other systems where flat panel displays are desired. The display device 600 may be implemented as an LCD display. In one embodiment the display and control logic of the known computer 100 are replaced by the display device 600 and display control logic, e.g., routines, of the present invention to provide a portable computer with horizontal RGB striping and pixel sub-components which are used to represent different portions of an image.

As illustrated, the display device 600 includes 16 columns of pixel elements C1–C16 and 12 rows of pixel elements R1–R12 for a display having 16×12 pixels. The display 600 is arranged to be wider than it is tall as is the case with most computer monitors. While the display 600 is limited to 16×12 pixels for purposes of illustration in the patent, it is to be understood that monitors of the type illustrated in FIG.

7A can have any number of vertical and horizontal pixel elements allowing for displays having, e.g., 640×480, 800×600, 1024×768 and 1280×1024 ratios of horizontal to vertical pixel elements as well as ratios resulting in square displays.

Each pixel element of the display 600 includes 3 sub-components, a red pixel sub-component 602, a green pixel sub-component 604, and a blue pixel sub-component 606. In the FIG. 7A embodiment, each pixel sub-component 602, 604, 606 has a height that is equal to, or approximately equal to, ⅓ the height of a pixel and a width equal to, or approximately equal to, the width of the pixel.

In the monitor 600, the RGB pixel sub-components are arranged to form horizontal stripes. This is in contrast to the vertical striping arrangement used in the previously discussed monitor 200. The monitor 600 may be used, e.g., in particular graphics applications where, because of the application, it is desirable to have a greater vertical, as opposed to horizontal resolution.

Figure 7B:
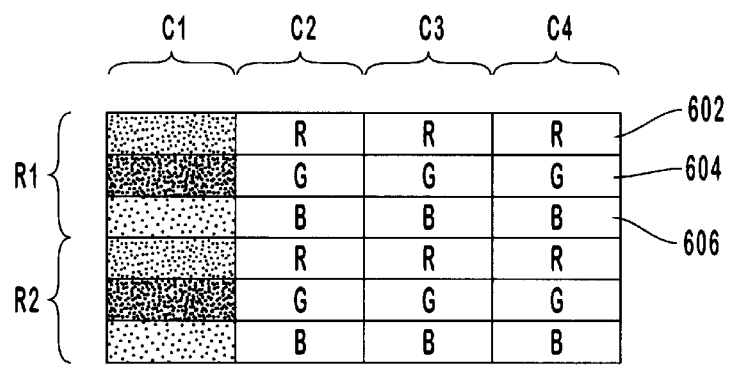
FIG. 7B illustrates a portion of the display screen of FIG. 7A.

FIG. 7B illustrates the upper left hand portion of the display 600 in greater detail. In FIG. 7B, the horizontal RGB striping pattern is clearly visible with the letters R, G and B being used to indicated correspondingly colored pixel sub-components.

Figure 7C:
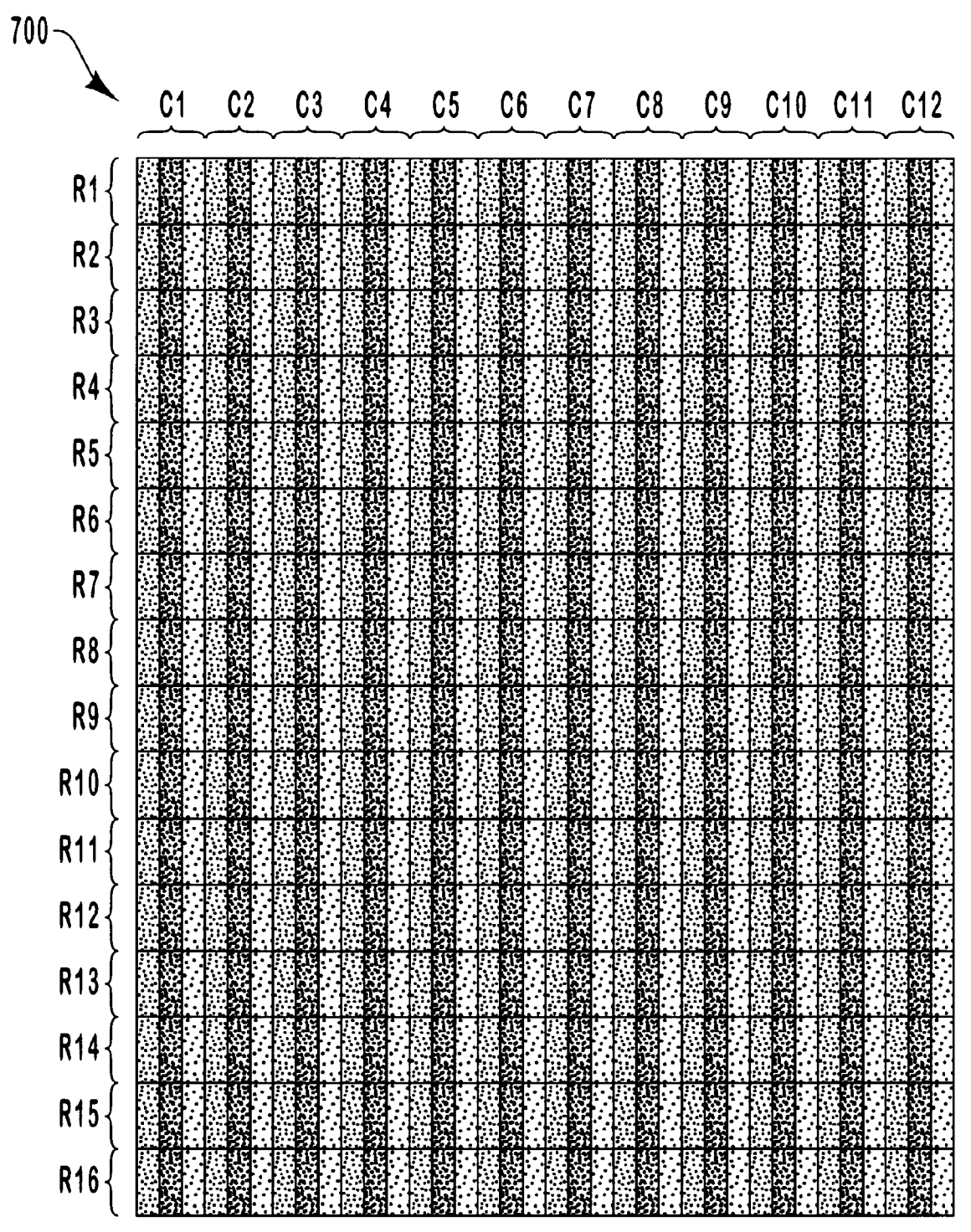

FIG. 7C illustrates another display device 700 implemented in accordance with the present invention. FIG. 7C illustrates the use of vertical RGB striping in a display device, e.g., an LCD display, having more vertical pixel elements than horizontal pixel elements. While a 12×16 display is illustrated, it is to be understood that the display 700 may be implemented with any number of columns/rows of pixels, including column/row ratios which result in square displays.

Figure 1:
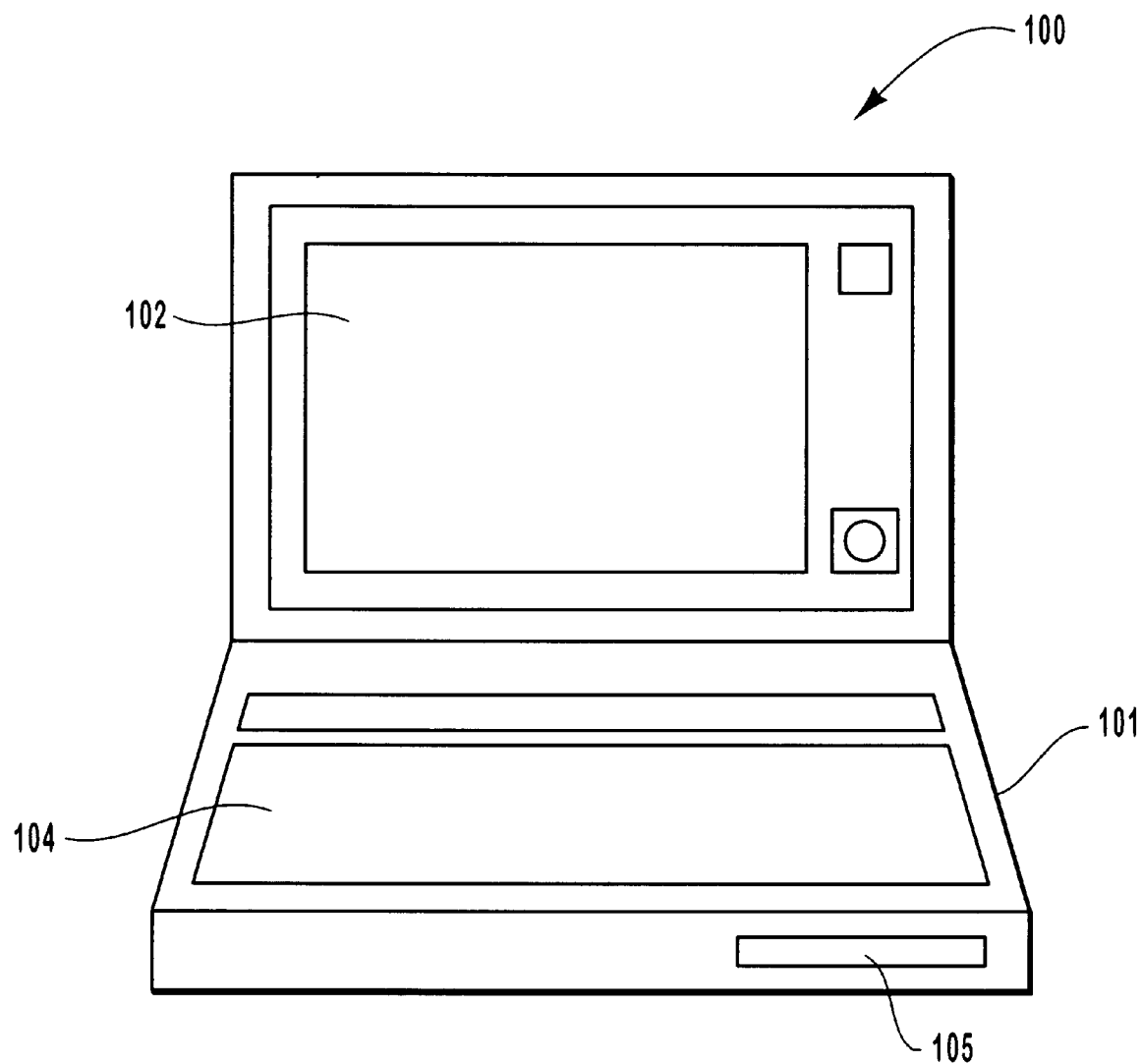
FIG. 1 is a diagram of a known portable computer.
Figure 2A:
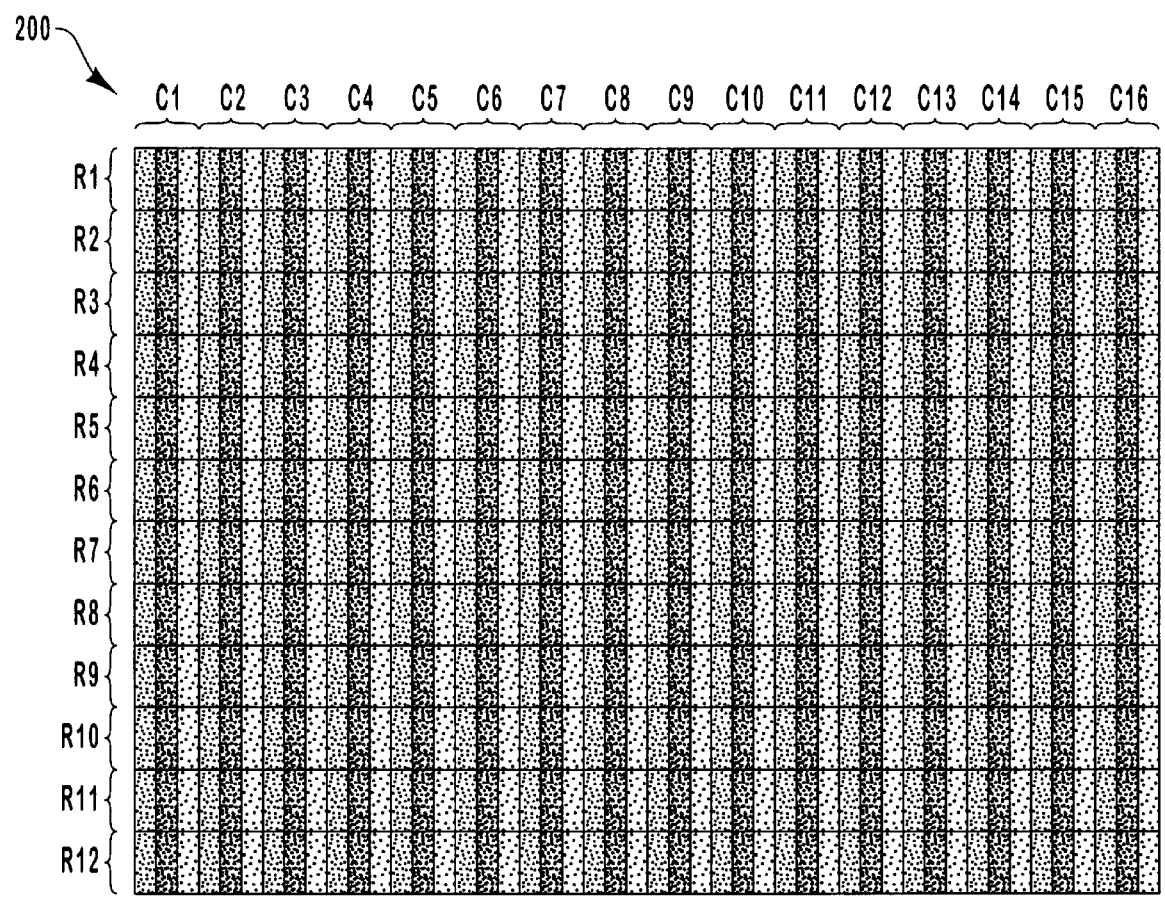
FIG. 2A illustrates a known LCD screen.
Figure 2B:
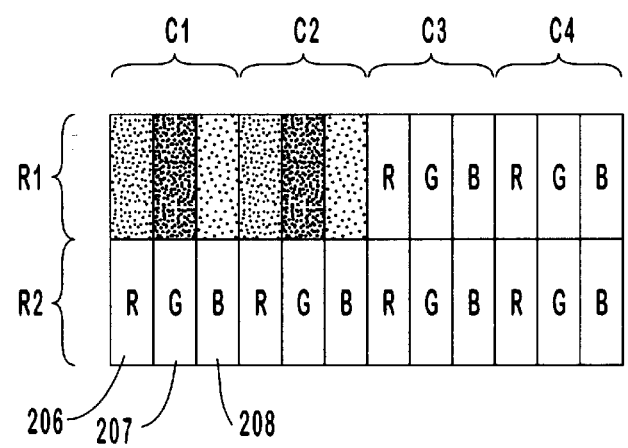
FIG. 2B illustrates a portion of the known screen illustrated in FIG. 2A in greater detail than the FIG. 2A illustration.

The display device 700 is well suited where a portrait type display of horizontally flowing text is desired. As with the monitor of FIG. 2A, each pixel element is comprised of 3 sub-pixel components, i.e., an R, G, and B pixel sub-component.

While the display 7A may be desirable for certain graphics applications, the accurate representation of character stems, the relatively long thin vertical portions of characters, is far more important than the representation of serifs in generating high quality characters. Vertical striping has the distinct advantage, when used according to the present invention, of allowing for stems which can be adjusted in width ⅓ of a pixel at a time. Thus, using a display device such as the device 200 or 700 with a vertical striping arrangement in conjunction with the display methods of the present invention can provide higher quality text than the known horizontal striping arrangement which limits stem width adjustments to one-pixel increments.

Another advantage of vertical striping is that it allows for adjustments in character spacing in increments of less than a pixel size in width, e.g., ⅓ of a pixel size increments. Character spacing is a text characteristic which is important to legibility. Thus, using vertical striping can produce improved text spacing as well as finer stem weights.

Figure 8:
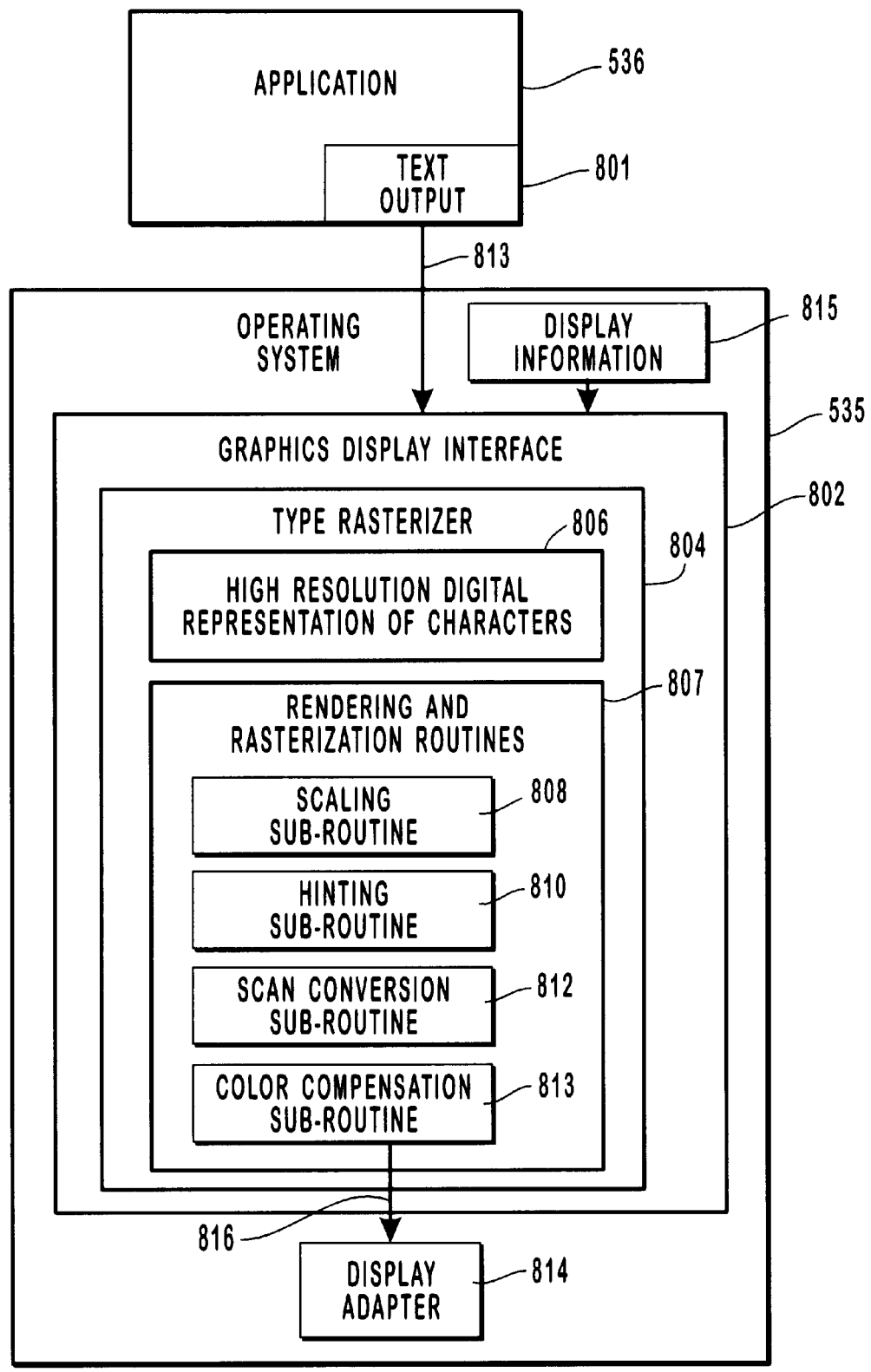
FIG. 8 illustrates various elements, e.g., routines, included in the memory of the computer system of FIG. 5, used for rendering text images on the computer system's display.

FIG. 8 illustrates various elements, e.g., routines, included in the memory of the computer system of FIG. 5, used to render text images on the computer system's display in accordance with the present invention.

As illustrated, the application routine 536, which may be, e.g., a word processor application, includes a text output sub-component 801. The text output sub-component 801 is responsible for outputting text information, as represented by arrow 813, to the operating system 535 for rendering on the display device 547. The text information includes, e.g., information identifying the characters to be rendered, the font to be used during rendering, and the point size at which the characters are to be rendered.

The operating system 535 includes various components responsible for controlling the display of text on the display device 547. These components include display information 815, a display adapter 814, and a graphics display interface 802. The display information 815 includes, e.g., information on scaling to be applied during rendering and/or foreground/background color information. The display adapter receives bitmap images from the graphics display interface 802 and generates video signals which are supplied to video adapter 548 for optical presentation by the display 547. The arrow 816 represents passing of the bitmap images from the graphics display interface 802 to the display adapter 814.

The graphics display interface 802 includes routines for processing graphics as well as text. Element 804 is a type rasterizer used to process text. The type rasterizer is responsible for processing the text information obtained from the application 536 and generating a bitmap representation therefrom. The type rasterizer 804 includes character data 806 and rendering and rasterization routines 807.

The character data 806 may include, e.g., vector graphics, lines, points and curves, which provide a high resolution digital representation of one or more sets of characters.

Figure 3:
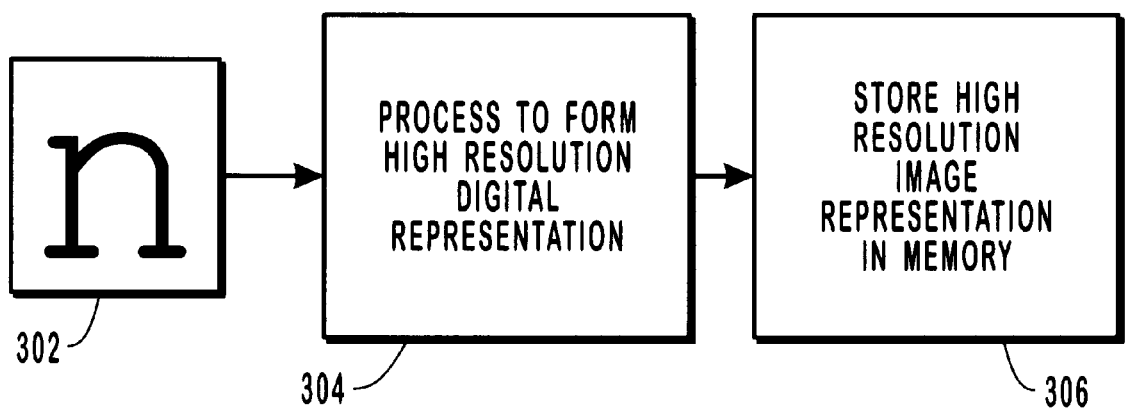
FIG. 3 illustrates known steps involved in preparing and storing character information for use in the subsequent generation and display of text.

As illustrated in FIG. 3, it is known to process text characters 302 to generate high resolution digital representations thereof, such as the data 806, which can be stored in memory for use during text generation. Accordingly, the generation 304 and storage 306 of data 806, will not be discussed herein in any detail.

The rendering and rasterization routines 807 include a scan conversion sub-routine 812 and can also include a scaling sub-routine 808, a hinting sub-routine 810, and a color compensation subroutine 813. While performing scan conversion operations to render text images is commonplace, the routines and sub-routines of the present invention differ from known routines in that they take into consideration, utilize, or treat a screen's RGB pixel sub-components as separate luminous intensity entities which can be used to represent different portions of an image to be rendered.

B. Scan Conversion Operations

Figure 2C:
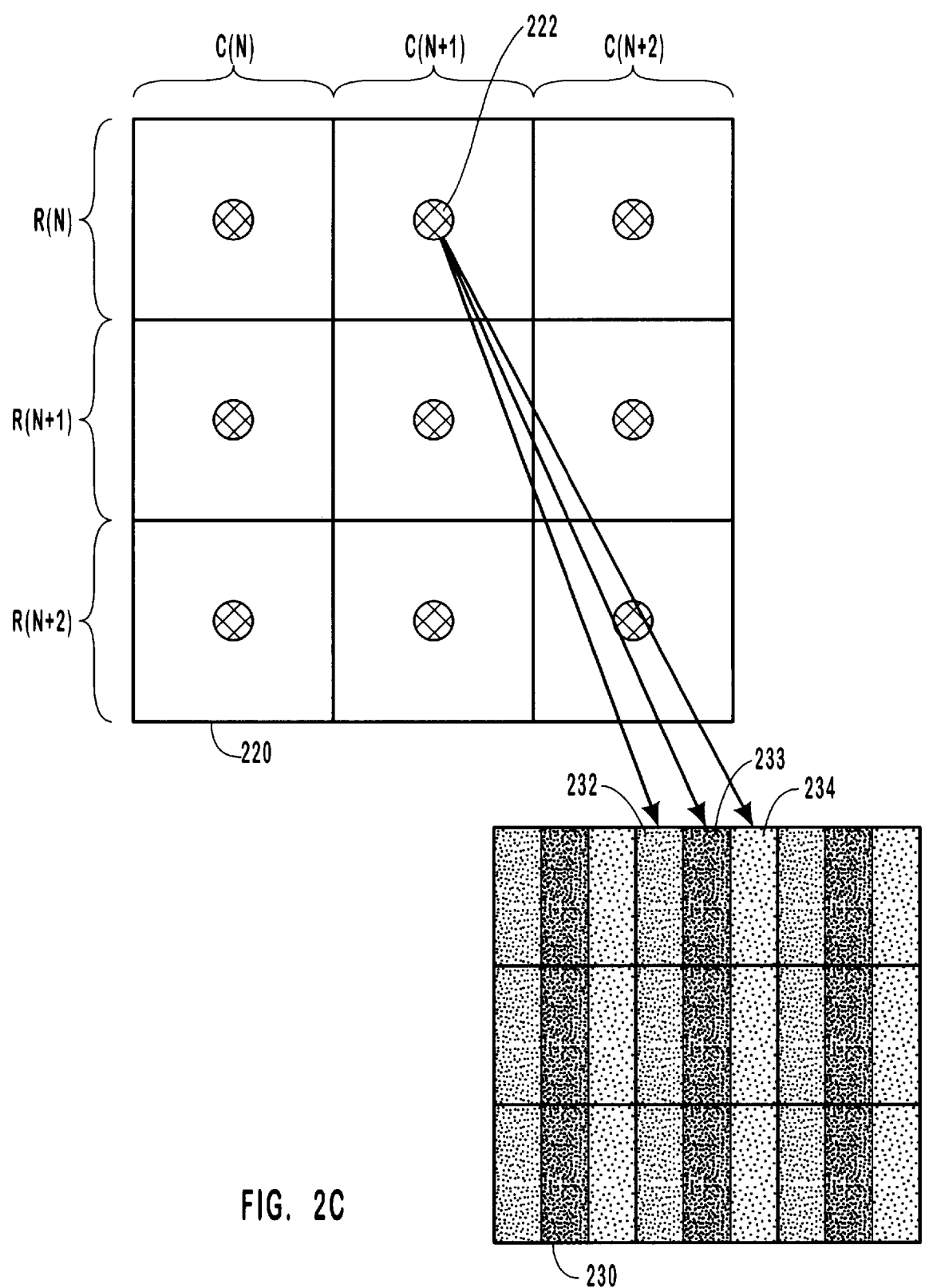
FIG. 2C illustrates an image sampling operation performed in known systems.

Scan conversion involves the conversion of the scaled geometry representing a character into a bitmap image. Conventional scan conversion operations treat pixels as individual units into which a corresponding portion of the scaled image can be mapped. Accordingly, in the case of conventional scan conversion operations, the same portion of an image is used to determine the luminous intensity values to be used with each of the RGB pixel sub-components of a pixel element into which a portion of the scaled image is mapped. FIG. 2C is exemplary of a known scan conversion process which involves sampling an image to be represented as a bitmap and generating luminous intensity values from the sampled values.

In accordance with the present invention, the RGB pixel sub-components of a pixel are treated as independent luminous intensity elements. Accordingly, each pixel sub-component is treated as a separate luminous intensity component into which a separate portion of the scaled image can be mapped. Thus, the present invention allows different portions of a scaled image to be mapped into different pixel sub-components providing for a higher degree of resolution than is possible with the known scan conversion techniques. That is, in various embodiments, different portions of the scaled image are used to independently determine the luminous intensity values to be used with each pixel sub-component.

Figure 6:
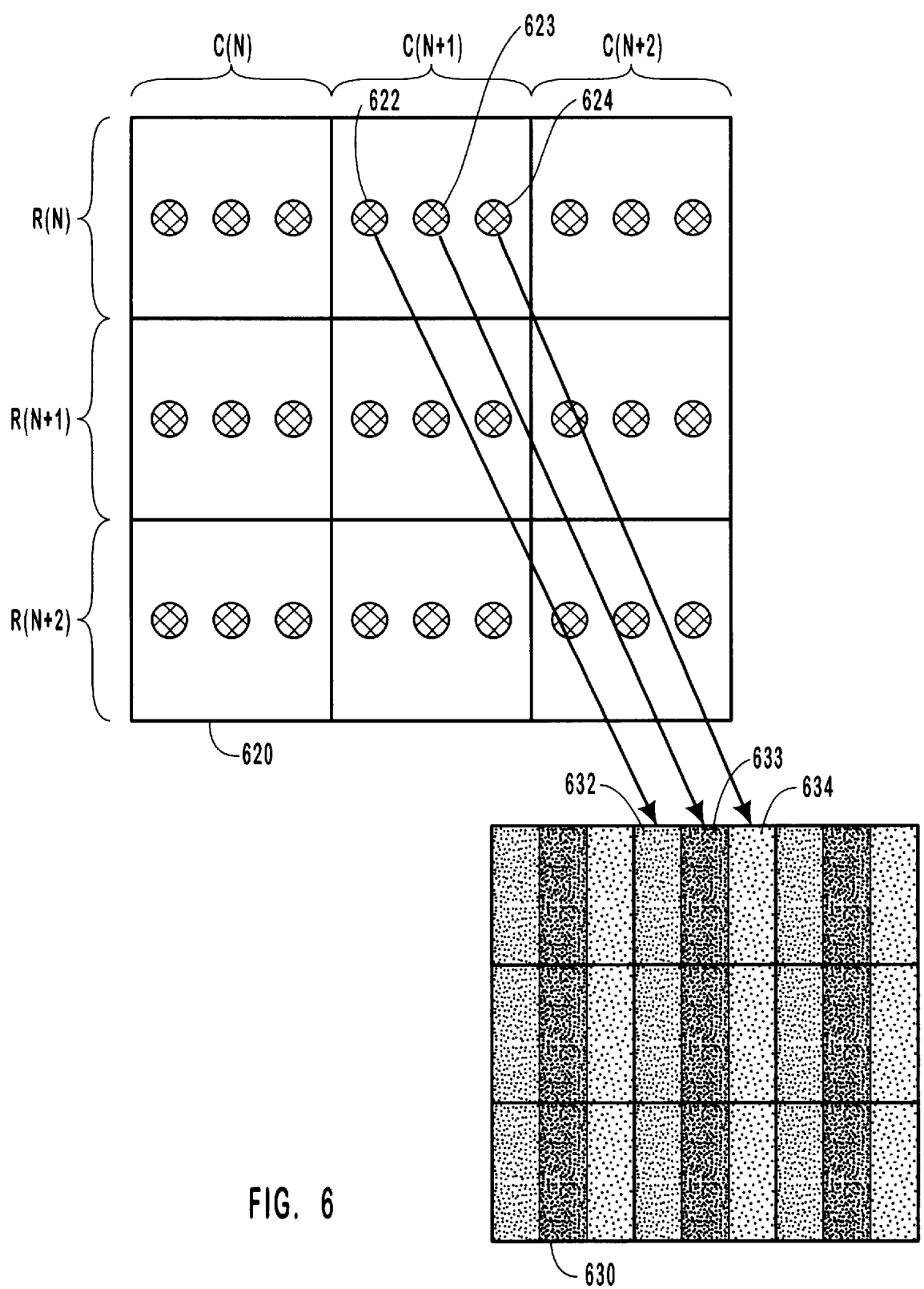
FIG. 6 illustrates image sampling performed in accordance with one exemplary embodiment of the present invention.

FIG. 6 illustrates an exemplary scan conversion implemented in accordance with one embodiment of the present invention. In the illustrated embodiment, separate image samples 622, 623, 624 of the image represented by the grid 620 are used to generate the red, green and blue intensity values associated with corresponding portions 632, 633, 634 of the bitmap image 630 being generated. Sampling the image data and mapping separate image samples 622, 623 and 624 to the red, green, and blue pixel sub-components associated with portions 632, 633, and 634 as shown in FIG. 6 represent examples of acts that correspond to the step of mapping samples to individual pixel sub-components. In the FIG. 6 example, image samples for red and blue are displaced −⅓ and +⅓ of a pixel width in distance from the green sample, respectively. Thus, the displacement problem encountered with the known sampling/image representation method illustrated in FIG. 2C is avoided.

In the examples illustrated in the figures, white is used to indicate pixel sub-components which are "turned on" in the bitmap image generated by the scan conversion operation. Pixel sub-components which are not white are "turned off".

In the case of black text "on" implies that the intensity value associated with the pixel sub-component is controlled so that the pixel sub-component does not output light. Assuming a white background pixel, sub-components which are not "on" would be assigned intensity values which would cause them to output their full light output.

In the case where foreground and background colors are used, "on" means that a pixel sub-component is assigned a value which would produce the specified foreground color if all three pixel sub-components were used to generate the foreground color. Pixel sub-components which are not "on" are assigned values which would produce the specified background color if all three pixel sub-components were used to generate the background color.

A first technique for determining if a pixel sub-component should be turned "on" during scaling is to determine if the center of the scaled image segment, represented by a portion of the scaling grid, being mapped into the pixel sub-component is within the scaled representation of the image to be displayed. For example, in FIG. 12A, when the center of grid segment 1202 was inside the image 1004 (shown in FIG. 11A), the pixel sub-component C1, R5 would be turned on. Another technique is to determine if 50% or more of the scaled image segment being mapped into the pixel sub-component is occupied by the image to be displayed. If it is, then the pixel sub-component is turned "on". For example, when the scaled image segment represented by grid segment 1202 is occupied at least 50% by the image 1004, then the corresponding pixel sub-component C1, R5 is turned on. In the examples of FIGS. 12A, 12B, 13 and 14, which are discussed below, the first technique of determining when to turn a pixel sub-component on is employed.

Figure 10A:
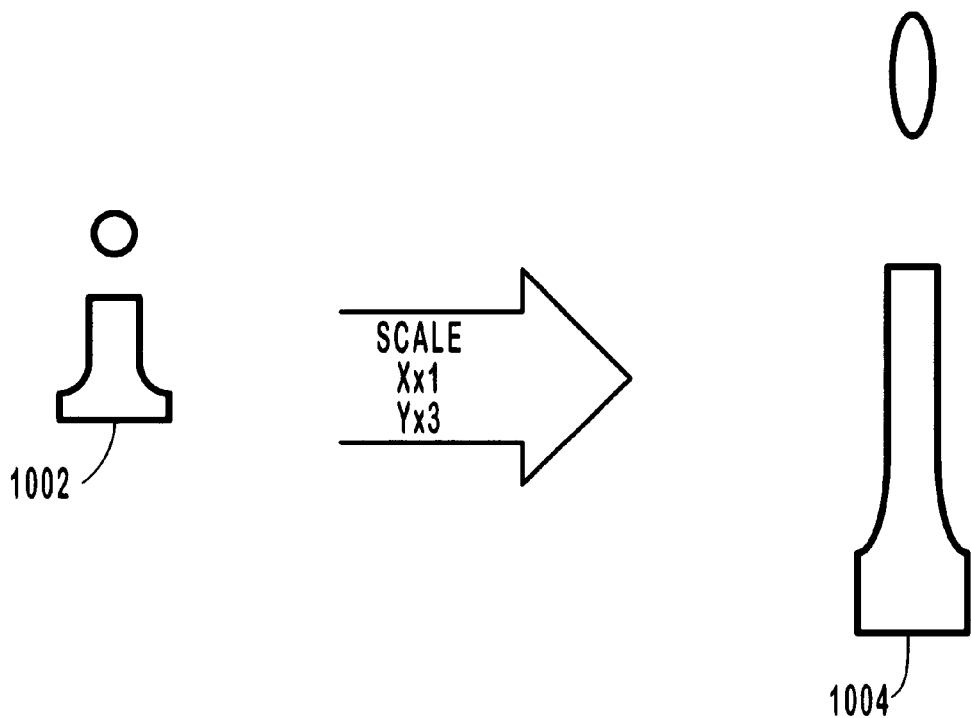
FIGS. 10A and 10B illustrate scaling operations performed in accordance with various exemplary embodiments of the present invention.
Figure 11A:
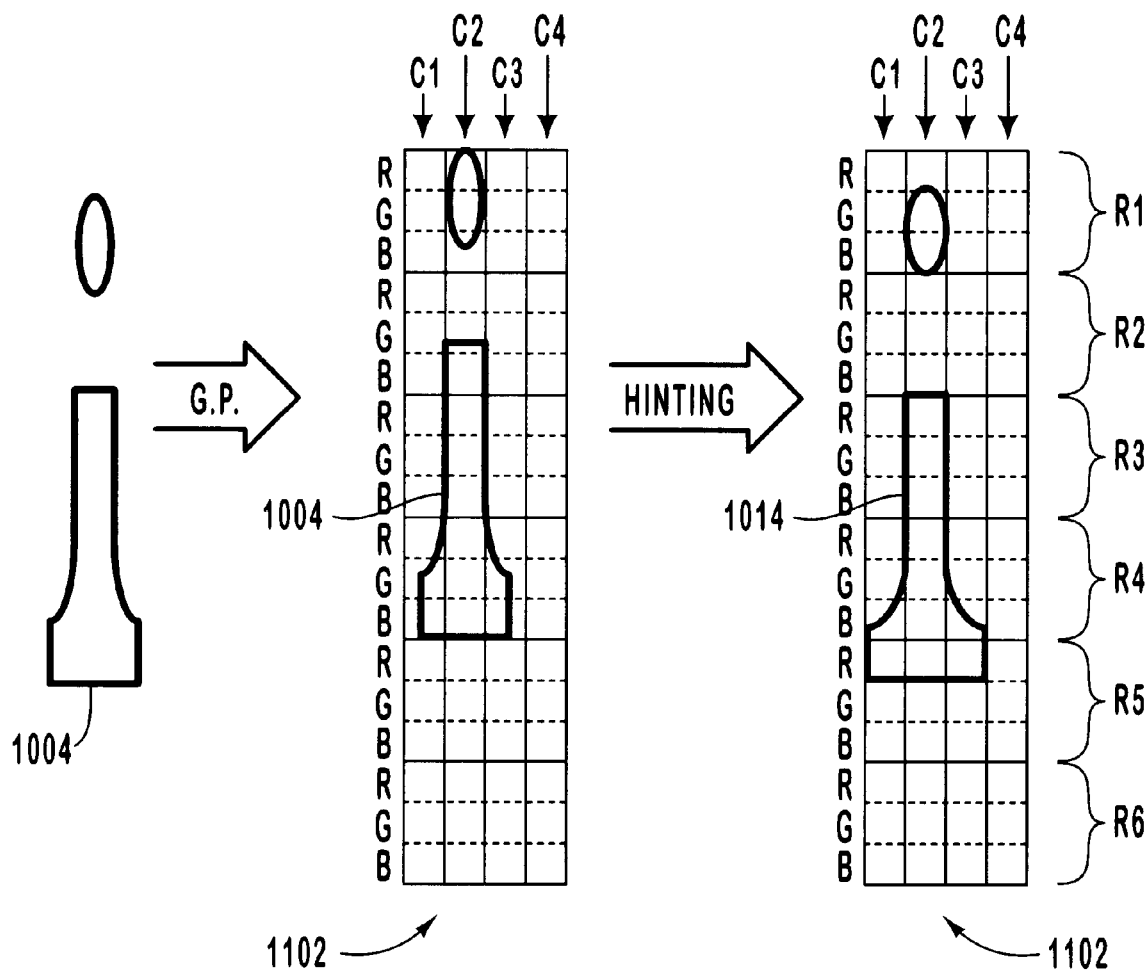
FIGS. 11A and 11B illustrate hinting operations performed in accordance with various exemplary embodiments of the present invention.
Figure 12A:
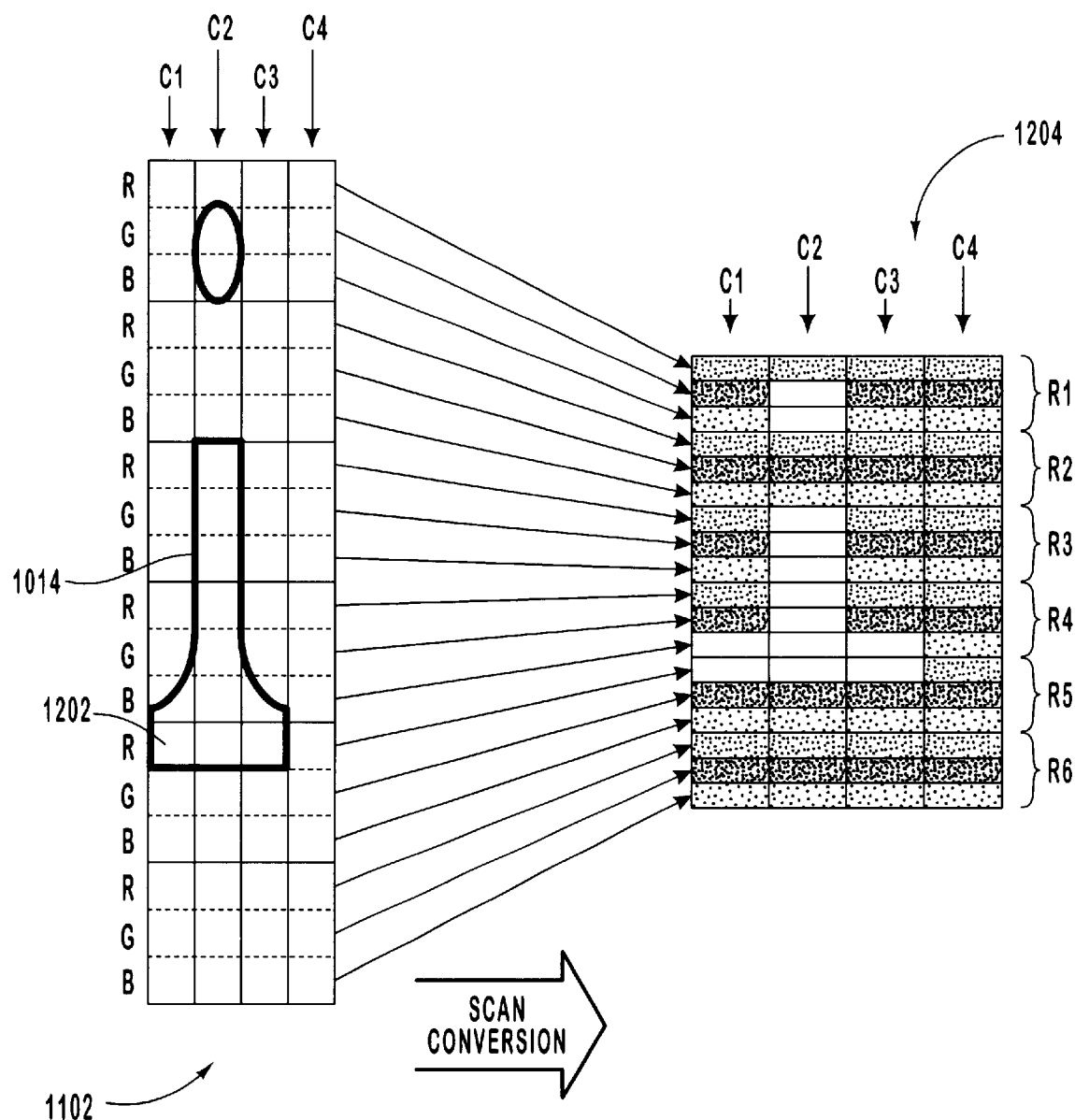
FIGS. 12A and 12B illustrate scan conversion operations performed in accordance with various exemplary embodiments of the present invention.

FIG. 12A illustrates a scan conversion operation performed on a scaled hinted image 1014 for display on a display device with horizontal striping. Examples of the scaling and hinting operations that can result in image 1014 are described in greater detail below in reference to FIGS. 10A and 11A. To briefly summarize these exemplary scaling and hinting operations, however, FIG. 10A illustrates a scaling operation performed on a high resolution representation of the letter i 1002 in anticipation of the display of the letter on a monitor with horizontal striping such as the one illustrated in FIG. 7A. Note that in this example scaling in the horizontal (X) direction is applied at a rate of ×1 while scaling in the vertical (Y) direction is applied at a rate of ×3. This results in a scaled character 1004 that is 3 times taller but just as wide as the original character 1002. Scaling by other amounts is possible.

Hinting, when used with the scan conversion operations of the invention, can involve the alignment of a scaled character, e.g., the character 1004 of FIG. 11A within a grid 1102 that is used as part of the subsequent scan conversion operation. It can also involve the distorting of image outlines so that the image better conforms to the shape of the grid. The grid can be determined as a function of the physical size of a display device's pixel elements. The hinting operation of FIG. 11A results in the hinted image 1014.

The scan conversion operation of FIG. 12A results in the bitmap image 1204. Note how each pixel sub-component of bitmap image columns C1–C4 is determined from a different segment of the corresponding columns of the scaled hinted image 1014. Note also how the bitmap image 1204 comprises a ⅔ pixel height base aligned along a green/blue pixel boundary and a dot that is ⅔ of a pixel in height. Known text imaging techniques would have resulted in a less accurate image having a base a full pixel high and a dot which was a full pixel in size.

Figure 10B:
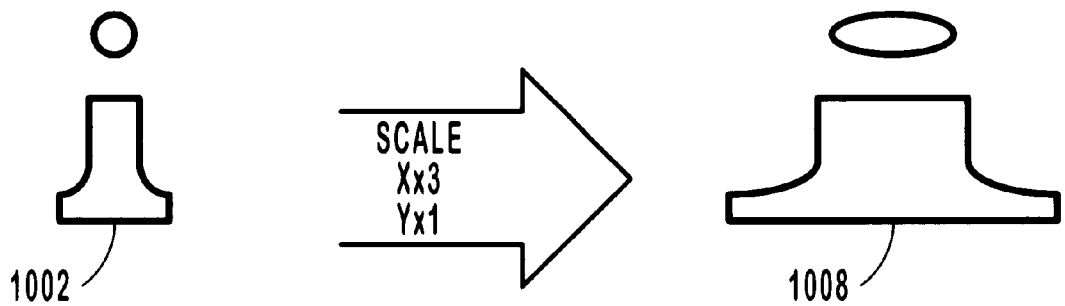
Figure 11B:
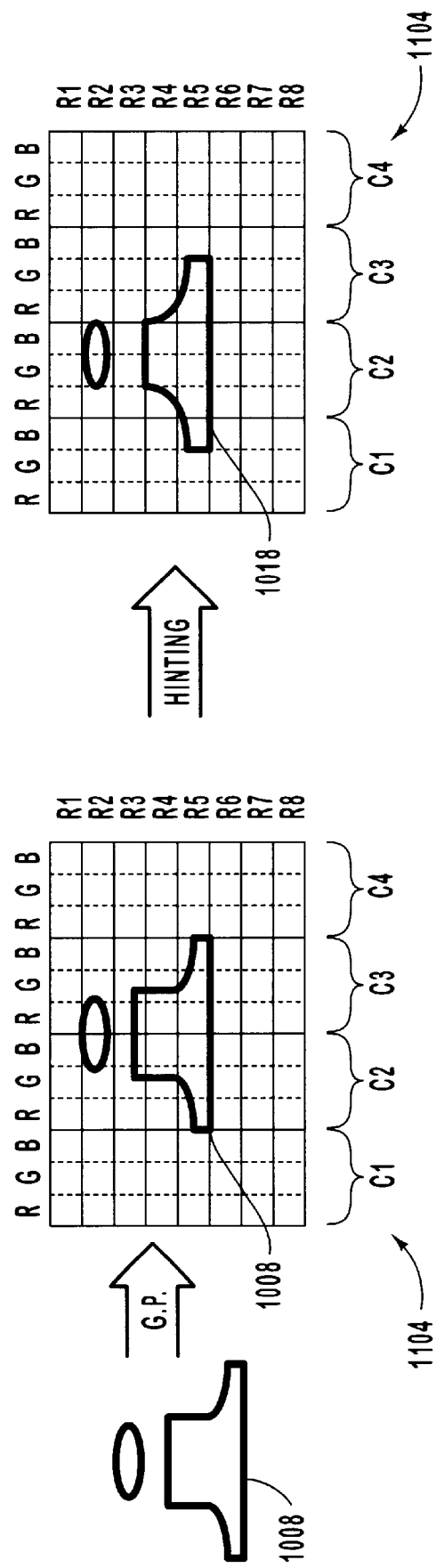
Figure 12B:
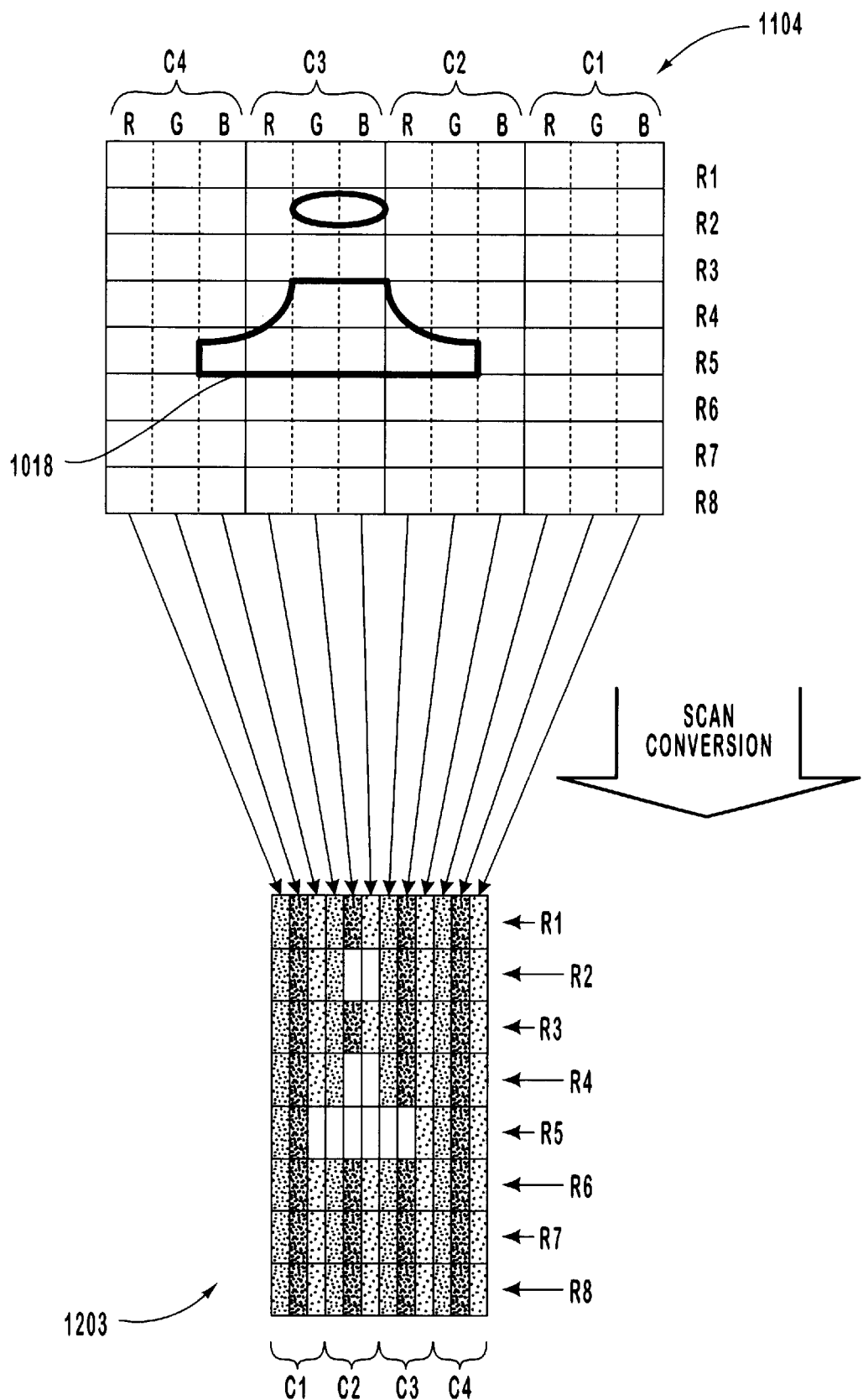

FIG. 12B illustrates a scan conversion operation performed on the hinted image 1018 for display on a display device with vertical striping. Examples of the scaling and hinting operations that can result in image 1018 are described below in reference to FIGS. 10B and 11B. To briefly summarize these exemplary scaling and hinting operations, however, FIG. 10B illustrates a scaling operation performed on a high resolution representation of the letter i 1002 in anticipation of the display of the letter on a monitor with vertical striping such as the one illustrated in FIGS. 2A and 7C. Note that in this example scaling in the horizontal (X) direction is applied at a rate of ×3 while scaling in the vertical (Y) direction is applied at a rate of ×1. This results in a scaled character 1008 that is just as tall as the original character 1002 but three times wider. Scaling by other amounts is possible.

FIG. 11B illustrates a hinting operation that results in the alignment of scaled character 1008 within grid 1104 that is used as part of the subsequent scan conversion operation. It can also involve the distorting of image outlines so that the image better conforms to the shape of the grid. The hinting operation of FIG. 11B results in the hinted image 1018.

The scan conversion operation of FIG. 12B results in the bitmap image 1203. Note how each pixel sub-component of bitmap image rows R1–R8 is determined from a different segment of the corresponding rows of the scaled hinted image 1018. Note also how the bitmap image 1203 comprises a ⅔ pixel width stem with a left edge aligned along a red/green pixel boundary. Notice also that a dot that is ⅔ of a pixel in width is used. Known text imaging techniques would have resulted in a less accurate image having a stem a full pixel wide and dot a full pixel in size.

Figure 13:
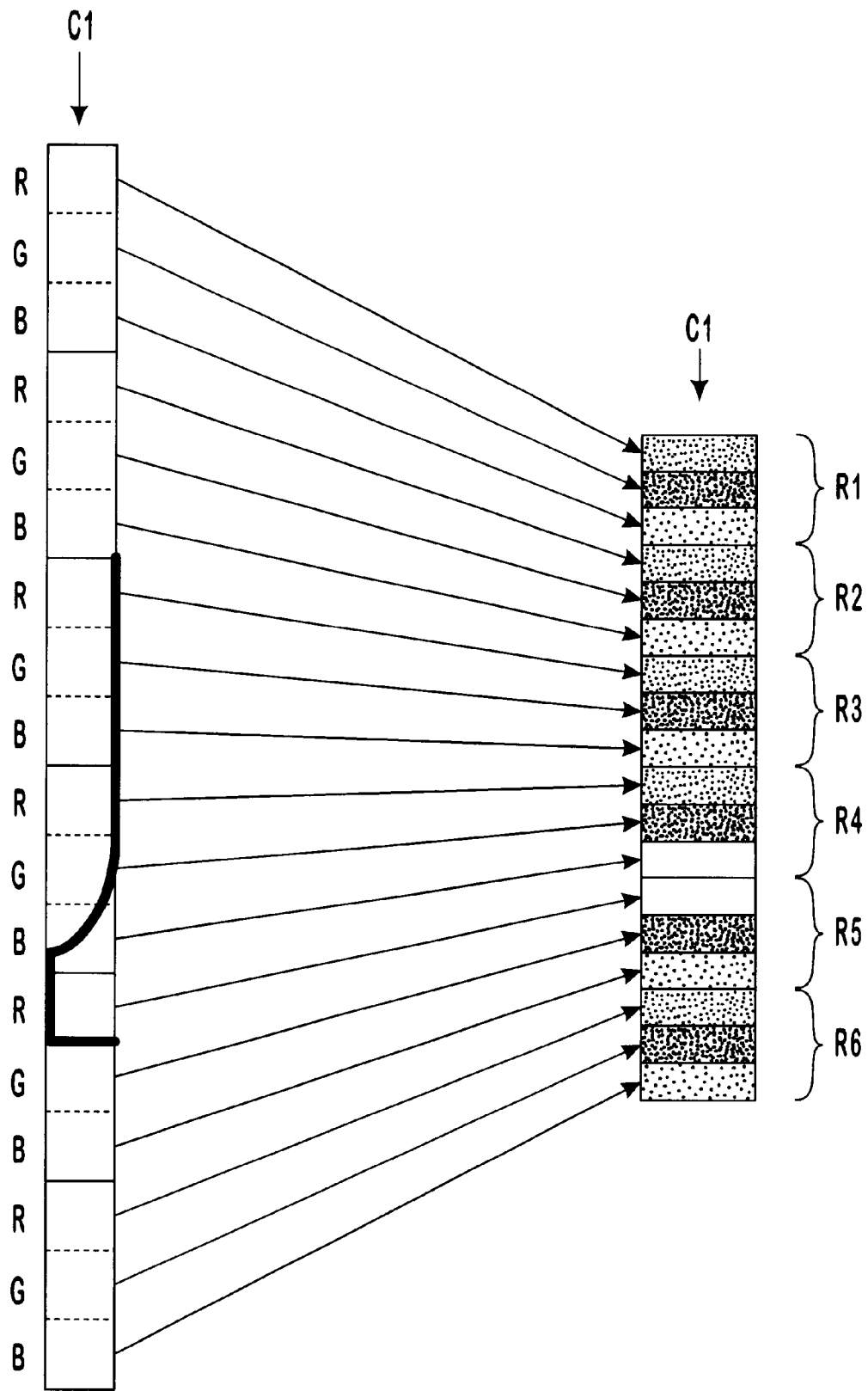
FIG. 13 illustrates the scan conversion process applied to the first column of image data illustrated in FIG. 12A in greater detail.

FIG. 13 illustrates the scan conversion processes performed to the first column of the image 1014, shown in FIG. 12A, in greater detail. In the illustrated scan conversion process, one segment of the image 1014 is used to control the luminous intensity value associated with each pixel sub-component. This results in each pixel sub-component being controlled by the same size portion of the image 1014.

Weighting may be applied during the scan conversion operation. When weighting is applied, different size regions of the scaled image may be used to determine whether a particular pixel sub-component should be turned on or off or to a value in between (as in the case of gray scaling).

As discussed above, the human eye perceives light intensity from different color light sources at different rates. Green contributes approximately 60%, red approximately 30% and blue approximately 10% to the perceived luminance of a white pixel which results from having the red, green and blue pixel sub-components set to their maximum luminous intensity output.

In accordance with one embodiment of the present invention, weighting is used during scan conversion so that 60% of the scaled image area that is mapped into a pixel is used to determine the luminous intensity of the green pixel sub-component, a separate 30% of the scaled image area that is mapped into the same pixel is used to determine the luminous intensity of the red pixel sub-component, and a separate 10% of the scaled image area that is mapped into the same pixel is used to determine the luminous intensity of the blue pixel sub-component.

In one particular embodiment of the present invention, during the scaling operation, the image is scaled in the direction perpendicular to the striping at a rate which is ten times the rate of scaling in the direction of the striping. This is done to facilitate a weighted scan conversion operation. After hinting, the scaled image is then processed during scan conversion using a weighted scan conversion operation, e.g., of the type described above.

Figure 14:
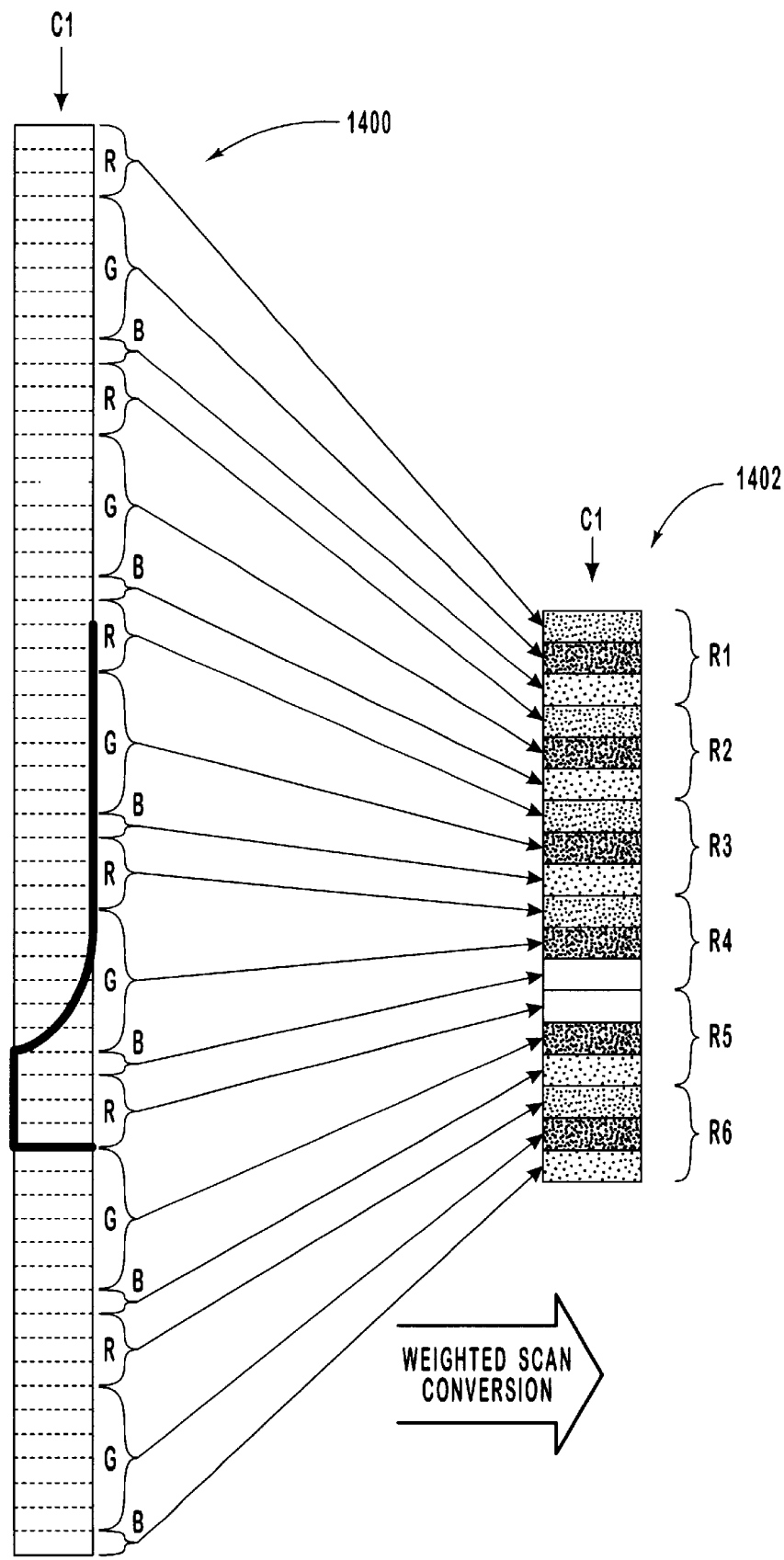
FIG. 14 illustrates a weighted scan conversion operation performed in accordance with one embodiment of the present invention.

FIG. 10A depicts an image 1002 that has been scaled by a factor of three in the vertical direction and a factor of one in the horizontal direction. In contrast, FIG. 14 illustrates performing a weighted scan conversion operation on the first column 1400 of a scaled hinted version of the image 1002 which has been scaled by a factor of 10 in the vertical direction and a factor of one in the horizontal direction. In FIG. 14, the portion of the hinted image which corresponds to a single pixel comprises 10 segments. In accordance with the weighted scaling technique discussed above, the first three segments of each pixel area of the scaled image are used to determine the luminous intensity value of a red pixel sub-component corresponding to a pixel in the bitmap image 1402. The next six segments of each pixel area of the scaled image 1400 are used to determine the luminous intensity value of a green pixel sub-component corresponding to the same pixel in the bitmap image 1402. This leaves the last segment of each pixel area of the scaled image 1400 for use in determining the luminous intensity value of the blue pixel sub-component.

As illustrated in FIG. 14, this process results in the blue pixel sub-component of column 1, row 4 and the red pixel sub-component of column 1, row 5 of the bitmap image 1402 being turned "on" with the remaining pixel sub-components of column 1 being turned "off".

Generally, the scan conversion process of the present invention has been described in terms of turning a pixel sub-component "on" or "off".

Various embodiments of the present invention, particularly well suited for use with, e.g., graphics images, involve the use of gray scale techniques. In such embodiments, as with the embodiments discussed above, the scan conversion operation involves independently mapping portions of the scaled hinted image into corresponding pixel sub-components to form a bitmap image. However, in gray scale embodiments, the intensity value assigned to a pixel sub-component is determined as a function of the portion of the scaled image area being mapped into the pixel sub-component that is occupied by the scaled image to be displayed. For example, if, a pixel sub-component can be assigned an intensity value between 0 and 255, 0 being effectively off and 255 being full intensity, a scaled image segment (grid segment) that was 50% occupied by the image to be displayed would result in a pixel sub-component being assigned an intensity value of 127 as a result of mapping the scaled image segment into a corresponding pixel sub-component. In accordance with the present invention, the neighboring pixel sub-component of the same pixel would then have its intensity value independently determined as a function of another portion, e.g., segment, of the scaled image.

C. Exemplary Rendering Routines

Figure 9:
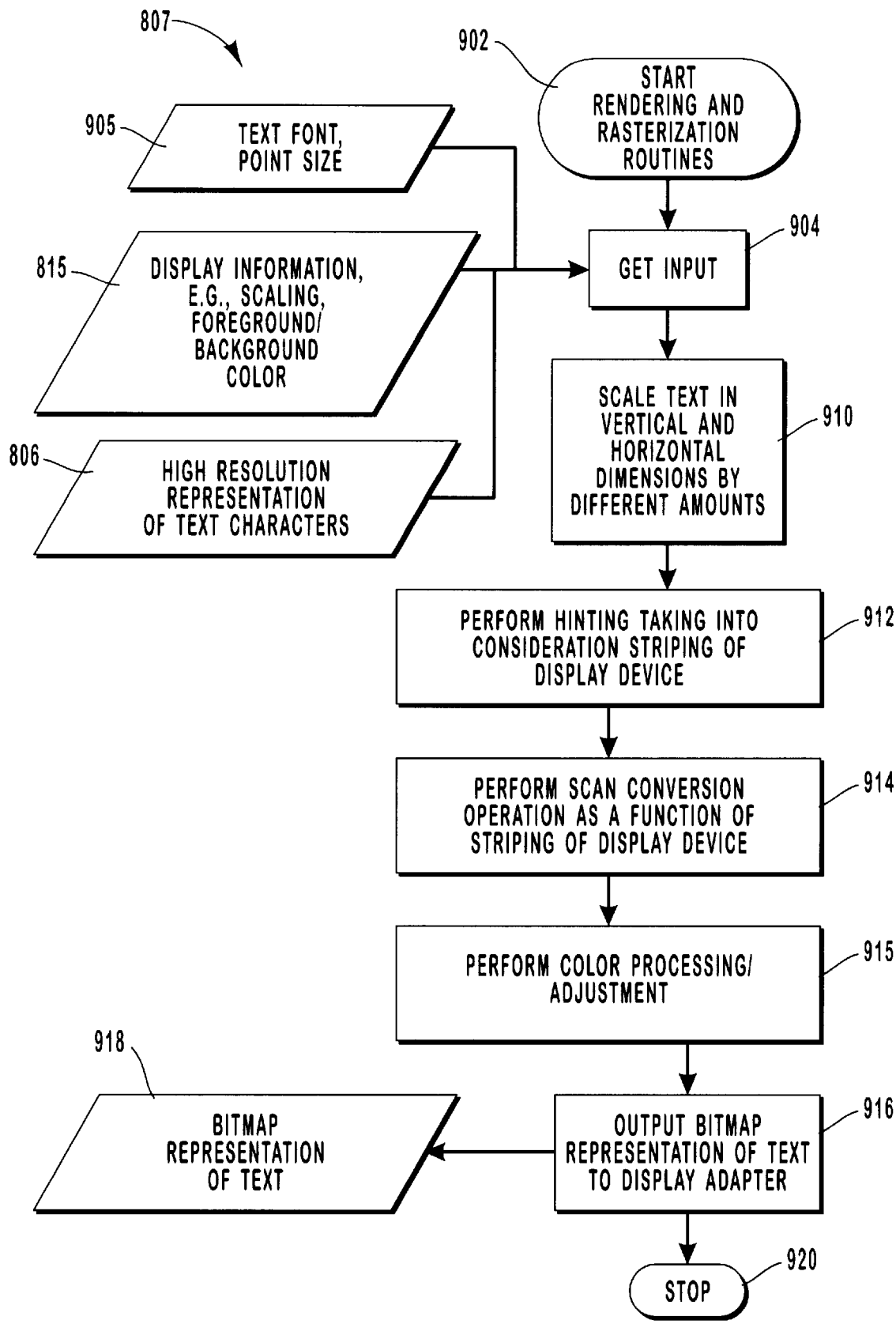
FIG. 9 illustrates a method of rendering text for display in accordance with one embodiment of the present invention.

The scan conversion operations of the invention can be used with the rendering and rasterization routines 807 of FIG. 9 to render text for display in accordance with one embodiment of the present invention. As illustrated, the routines 807 begin in step 902 wherein the routines are executed, e.g., under control of the operating system 535, in response to the receipt of text information from the application 536. In step 904 input is received by text rendering and rasterization routines 807. The input includes text, font, and point size information 905 obtained from the application 536. In addition, the input includes scaling information and/or foreground/background color information and pixel size information 815 obtained, e.g., from monitor settings stored in memory by the operating system. The input also includes the data 806 which includes a high resolution representation, e.g., in the form of lines, points and/or curves, of the text characters to be displayed.

With the input received in step 904, operation proceeds to step 910 wherein the scaling subroutine 808 may be used to perform a scaling operation. Non-square scaling can be performed as a function of the direction and/or number of pixel sub-components included in each pixel element. In particular, the high resolution character data 806, e.g., the line and point representation of characters to be displayed as specified by the received text and font information, is scaled in the direction perpendicular to the striping at a greater rate than in the direction of the striping. This allows for subsequent image processing operations to take advantage of the higher degree of resolution that can be achieved by using individual pixel sub-components as independent luminous intensity sources in accordance with the present invention.

Details of exemplary scaling operations that can be used with the scan conversion operations of the invention are disclosed in U.S. Pat. No. 6,188,385 at, for example, FIGS. 10A, 10B, and the accompanying text. The foregoing patent is incorporated herein by reference.

Referring once again to FIG. 9, operation then proceeds to step 912 in which hinting of the scaled image may be performed, e.g., by executing the hinting sub-routine 810. The term grid-fitting is sometimes used to describe the hinting process.

Hinting involves the alignment of a scaled character, e.g., the character 1004, 1008 within a grid 1102, 1104 that is used as part of a subsequent scan conversion operation. It also involves the distorting of image outlines so that the image better conforms to the shape of the grid. The grid is determined as a function of the physical size of a display device's pixel elements. Details of exemplary hinting operations that can be used with the scan conversion operations of the invention are disclosed in U.S. Pat. No. 6,188,385 at, for example, FIGS. 11A, 11B, and the accompanying text. Operation then proceeds to step 914 wherein a scan conversion operation, such as those disclosed herein, is performed in accordance with the present invention, e.g., by executing the scan conversion sub-routine 812.

Once the bitmap representation of the text to be displayed is generated in step 914 of FIG. 9 it may be output to the display adapter or processed further to perform color processing operations and/or color adjustments to enhance image quality. Details of exemplary color processing operations and color adjustments that can be used with the scan conversion operations of the invention are disclosed in U.S. Pat. No. 6,188,385.

The processed bitmap 918 is output to the display adapter 814 and operation of the routines 807 is halted pending the receipt of additional data/images to be processed.

Figure 15:
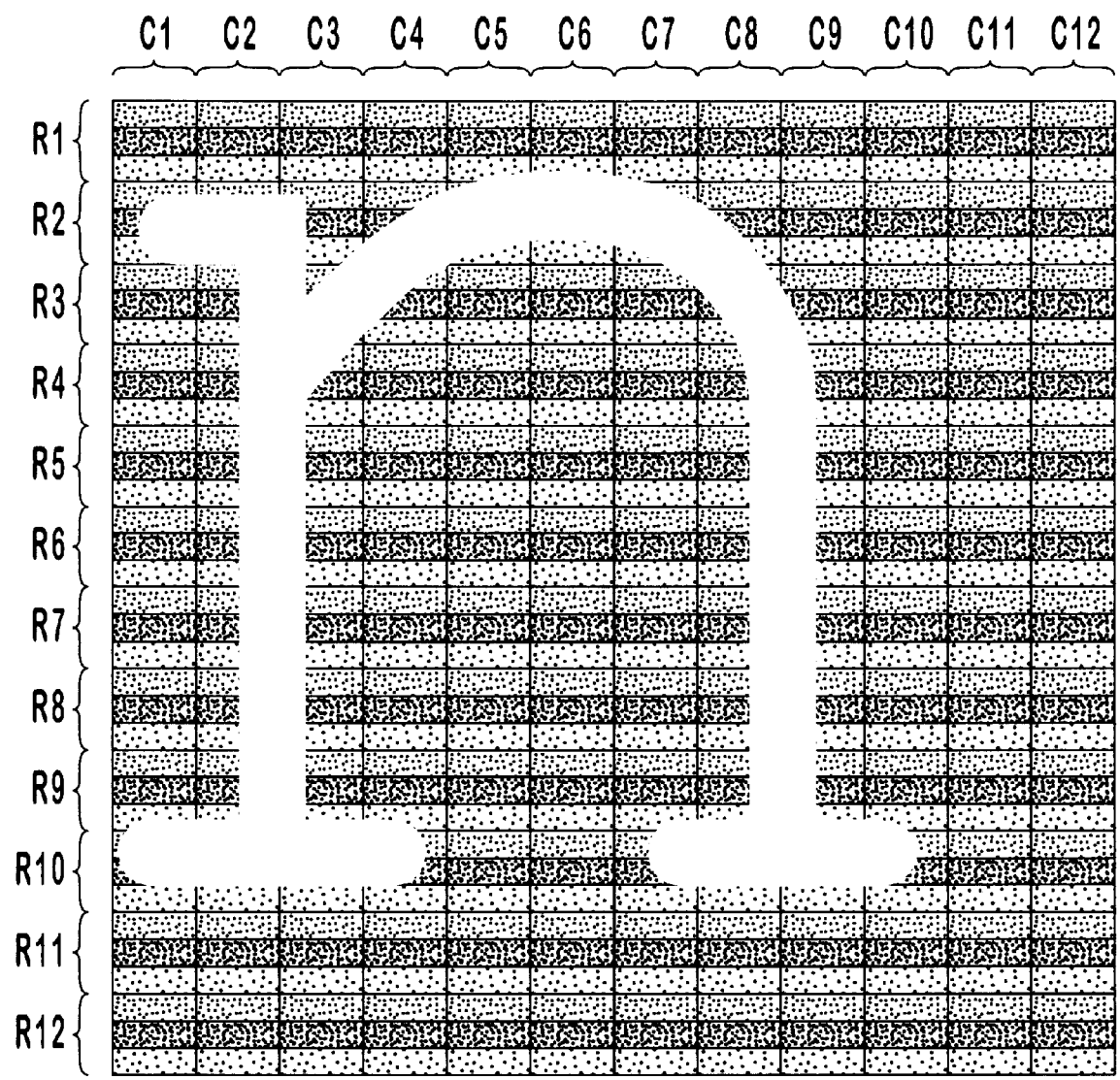
FIG. 15 illustrates a high resolution representation of a character to be displayed on a field of pixels.

FIG. 15 illustrates a high resolution representation of character n to be rendered superimposed on a grid representing an array of 12×12 pixels with horizontal striping.

Figure 16:
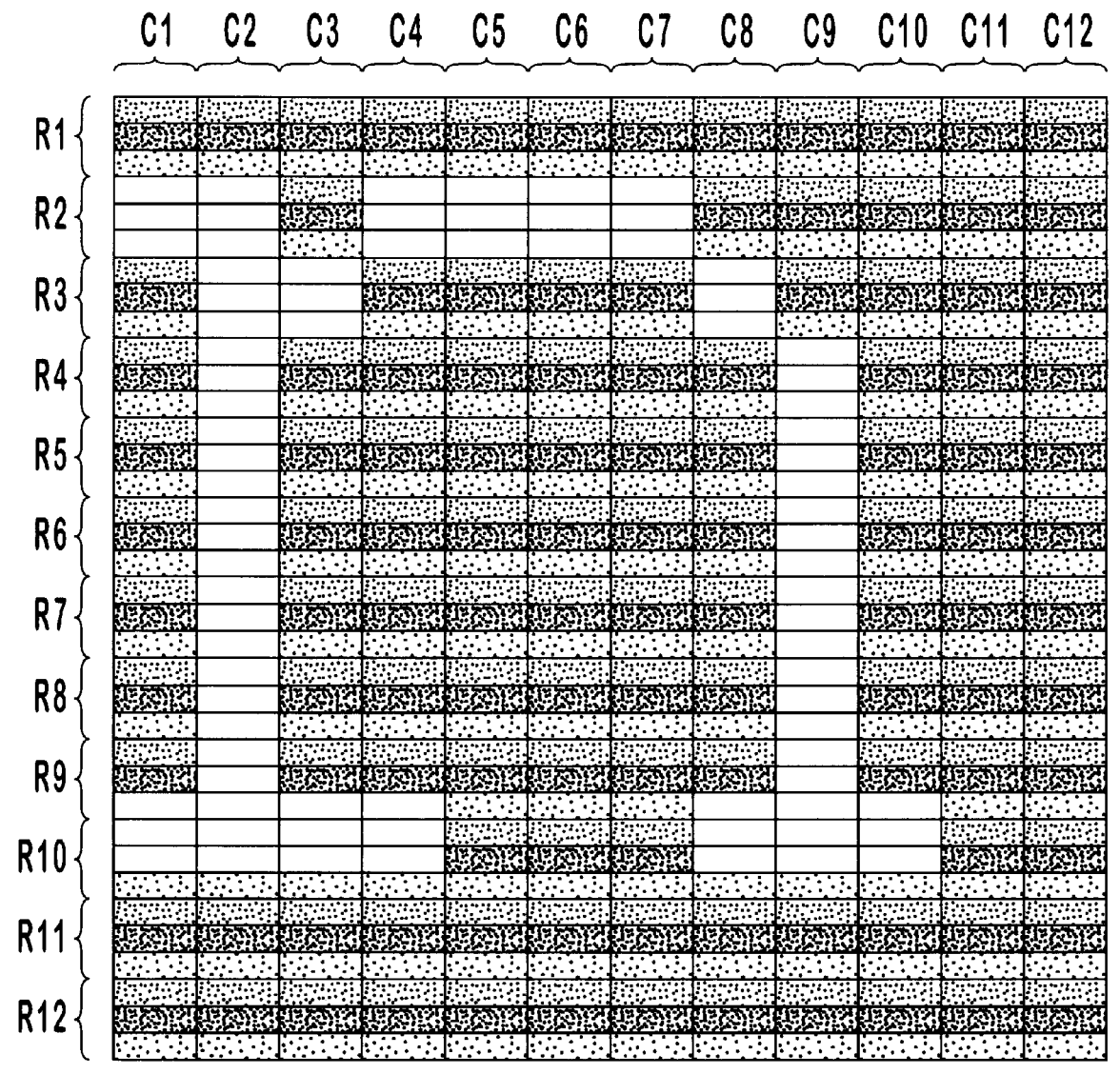

FIG. 16 illustrates how the character n illustrated in FIG. 15 would be rendered using conventional display techniques and full size pixel elements each including three pixel sub-components. Note how the full pixel size limitation results in relatively abrupt transitions in shape at the ridge of the letter resulting in aliasing and a relatively flat top portion.

Figure 17:
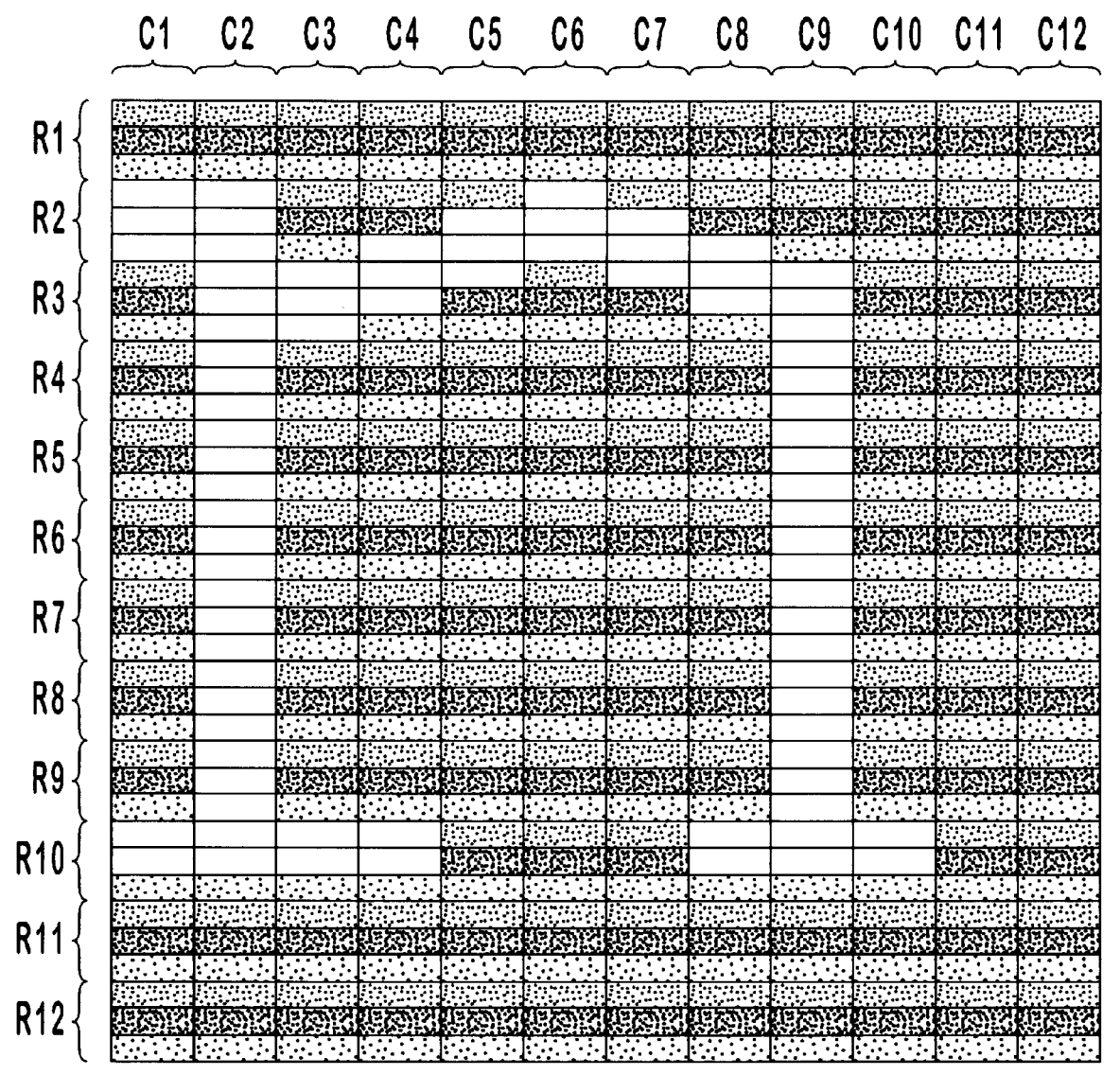

FIG. 17 illustrates how rendering of the letter n can be improved in accordance with the present invention by using a ⅔ pixel height base. The base is formed using 2 pixel sub-components as opposed to all three pixel sub-components in row 10, col. 1–4 and 8–10. Note also how the ridge of the letter has been improved by providing a ridge a full pixel height in width but with each horizontal full height pixel element staggered by a ⅓ pixel height in the vertical direction making for a much more accurate and smoother ridge than that illustrated in FIG. 16.

Figure 18:
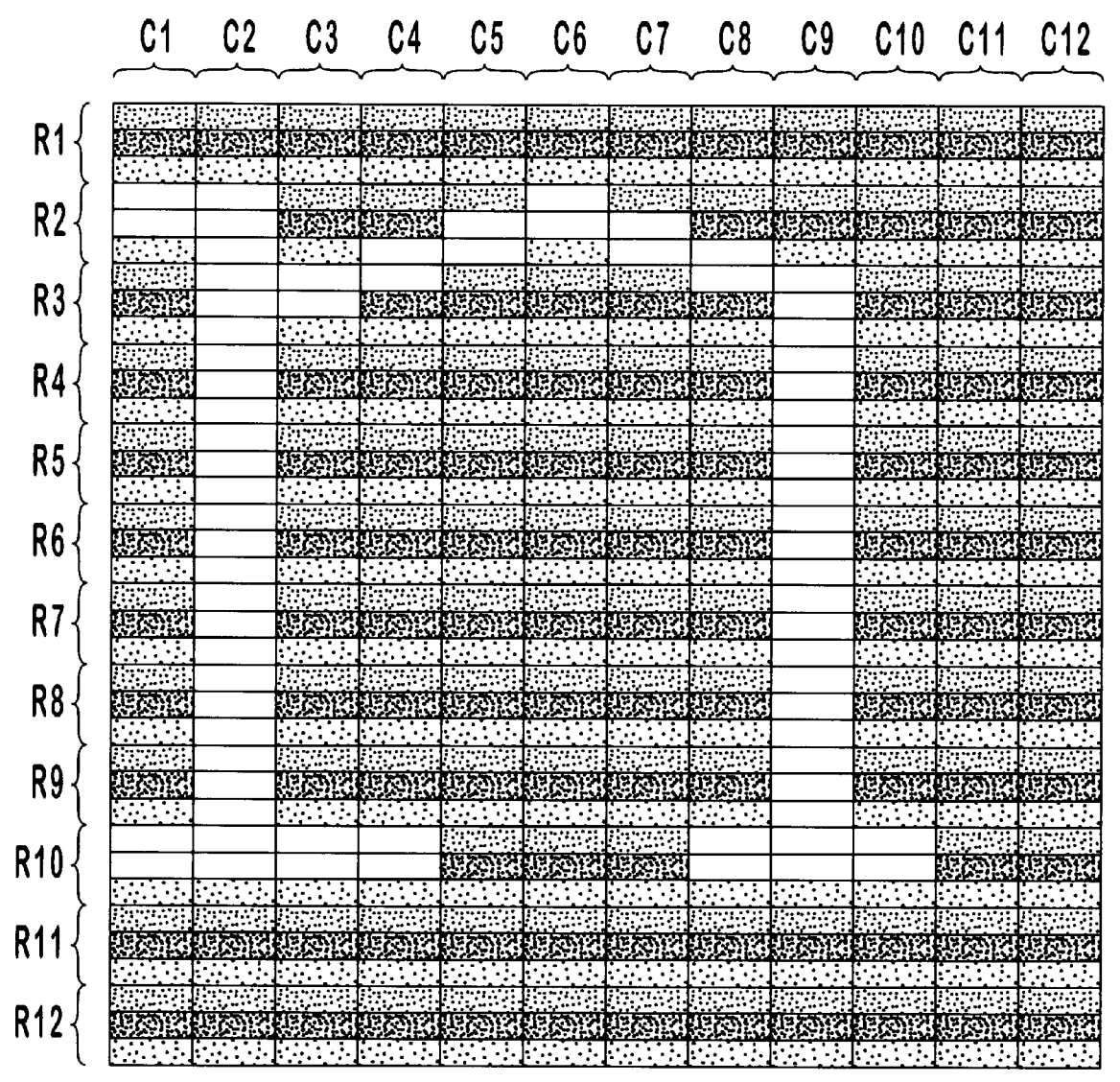

FIG. 18 illustrates how the ridge of the letter n can be reduced in thickness from one pixel in thickness to a ⅔ pixel thickness in accordance with the present invention.

Figure 19:
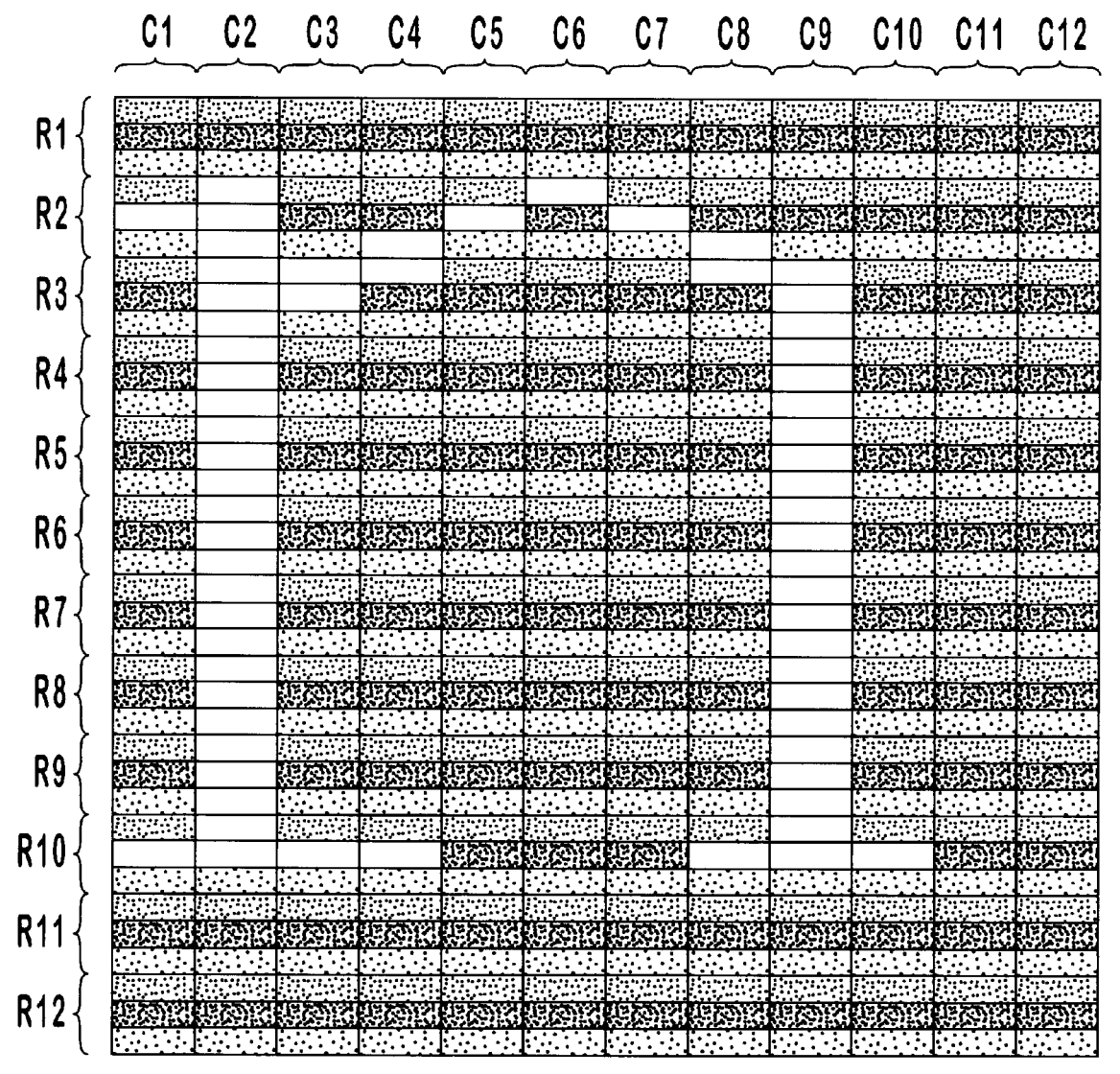

FIG. 19 illustrates how the base of the letter n can be reduced, in accordance with the present invention, to a minimal thickness of ⅓ that of a pixel. It also illustrates how portions of the ridge of the letter n can reduced to a thickness of ⅓ that of a pixel.

Figure 20:
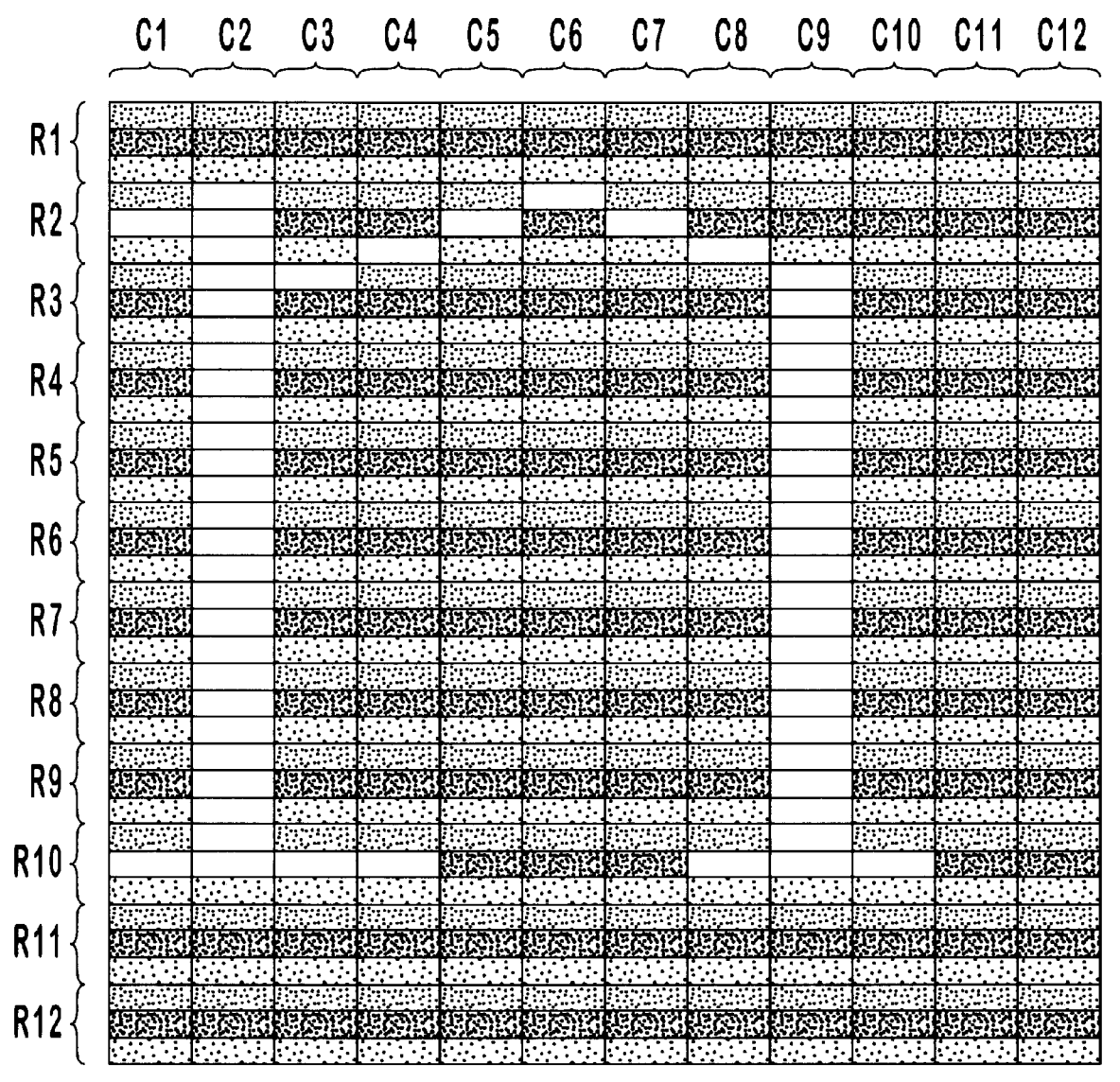

FIG. 20 illustrates how the letter n can be illustrated, in accordance with the present invention, with a base and ridge having a thickness of ⅓ that of a pixel.

Figure 4:
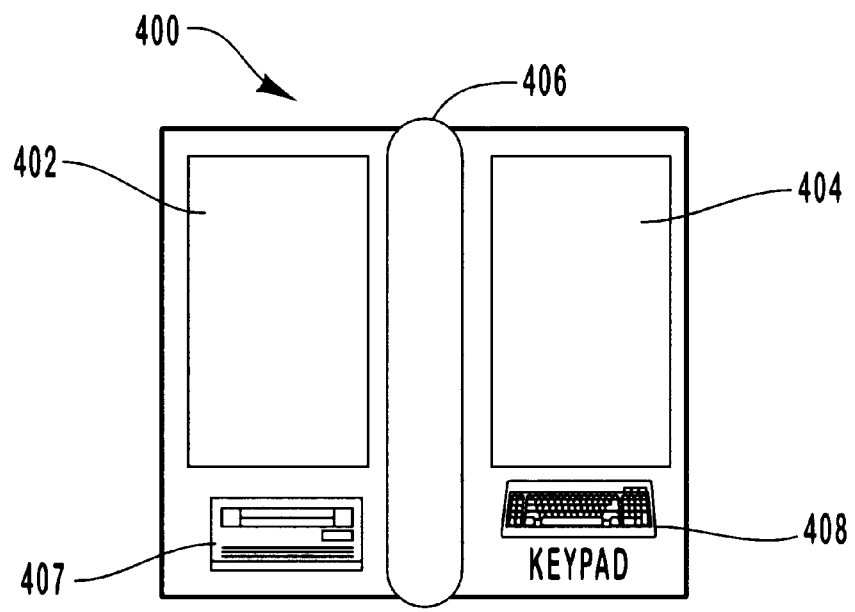
FIG. 4 illustrates an electronic book with flat panel displays arranged in a portrait arrangement in accordance with one embodiment of the present invention.

One example of the display devices on which the scan conversion operations of the invention can be implemented is illustrated in FIG. 4, which depicts a computerized electronic book device 400. As illustrated in FIG. 4, the electronic book 400 comprises first and second display screens 402, 404 for displaying odd and even pages of a book, respectively. A display device of the type illustrated in FIG. 7C, for example, may be used as the displays 402, 404 of the electronic book 400 of FIG. 4. The electronic book 400 further comprises an input device, e.g., keypad or keyboard 408 and a data storage device, e.g., CD disk drive 407. A hinge 406 is provided so that the electronic book 400 can be folded protecting the displays 402, 404 when not in use. An internal battery may be used to power the electronic book 400. Similarly, other portable computer embodiments of the present invention may be powered by batteries.

While the present invention has been described largely in the context of rendering text, it is to be understood that the present invention can be applied to graphics as well to reduce aliasing and increase the effective resolution that can be achieved using striped displays such as conventional color LCD displays. In addition, it is to be understood that many of the techniques of the present invention can be used to process bitmapped images, e.g., scanned images, to prepare them for display.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed is:

1. In a computer system including a processing unit and a display device for displaying an image, the display device having a plurality of pixels, each including at least three pixel sub-components each of a different color, a method for displaying an image on the display device with sub-pixel precision, comprising:

obtaining samples of information representing an image;

mapping different sets of one or more of the samples to individual pixel sub-components of the plurality of pixels of the display device, the individual pixel sub-components being separately controllable; and using the different sets of one or more of the samples, displaying the image on the display device, such that each of the pixel sub-components of the plurality of pixels represent different portions of the image, thereby displaying the image on the display device with sub-pixel precision.

2. The method of claim 1, wherein the pixel sub-components are arranged to form stripes on the display device of same-colored pixel sub-components.

3. The method of claim 2, further comprising scaling the information representing the image in the direction perpendicular to the stripes by a factor greater than in the direction parallel to the strips, the samples being obtained from the scaled information.

4. The method of claim 1, wherein at least some of the different sets of one or more of the samples mapped to pixel sub-components include some samples that are common to the samples included in the sets of samples that are mapped to adjacent pixel sub-components.

5. The method of claim 1, further comprising generating a separate luminous intensity value for each of the pixel sub-components of the plurality of pixels based on the different set of one or more of the samples mapped to the particular pixel sub-component, as opposed to generating luminous intensity values that for full pixels.

6. The method of claim 5, wherein generating a separate luminous intensity value comprises selecting an off or on luminous intensity value.

7. The method of claim 5, wherein generating a separate luminous intensity value comprises selecting gray scale luminous intensity values between completely off and completely on for at least some of the pixel sub-components.

8. The method of claim 1, wherein the different samples mapped to the at least three pixel sub-components of a particular pixel include different numbers of samples, such that each of said at least three pixel sub-components of the particular pixel has mapped thereto a different number of samples.

9. The method of claim 1, wherein the information representing the image includes an outline of the image and has associated therewith a foreground color and a background color.

10. The method of claim 1, wherein:

the display device is a liquid crystal display device having an arrangement of pixel sub-components that forms stripes on the liquid crystal display device of same-colored pixel sub-components;

the image includes a text character; and the different sets of the samples are mapped to the individual pixel sub-components of the plurality of pixels of the display device such that a stem of the text character is displayed having a stem width that is not an integer multiple of the width of a full pixel.

11. The method of claim 10, wherein at least some of the pixel sub-components on which at least a portion of the stem of the text character is displayed have gray scale luminous intensity values between completely off and completely on.

12. In a computer system including a processing unit and a display device for displaying an image, the display device having a plurality of pixels, each including at least three pixel sub-components each of a different color, a method for displaying a text character on the display device with sub-pixel precision, comprising:

obtaining samples of information representing a text character;

mapping different sets of one or more of the samples to individual pixel sub-components of the plurality of pixels of the display device, the individual pixel sub-components being separately controllable; and using the different sets of one or more of the samples, displaying the text character on the display device, such that each of the pixel sub-components of the plurality of pixels represent different portions of the image, thereby displaying the text character on the display device with sub-pixel precision, the displayed text character having a stem with a stem width that is not an integer multiple of the width of a full pixel.

13. The method of claim 12, wherein the display device is a liquid crystal display device having an arrangement of pixel sub-components that forms stripes on the liquid crystal display device of same-colored pixel sub-components.

14. The method of claim 12, wherein the information representing the text character includes an outline of the text character and has associated therewith a foreground color and a background color.

15. The method of claim 12, further comprising generating a separate luminous intensity value for each of the pixel sub-components of the plurality of pixels based on the different set of one or more of the samples mapped to the particular pixel sub-component, as opposed to generating luminous intensity values that for full pixels.

16. The method of claim 12, wherein the different samples mapped to the at least three pixel sub-components of a particular pixel include different numbers of samples, such that each of said at least three pixel sub-components of the particular pixel has mapped thereto a different number of samples.

17. The method of claim 12, wherein at least some of the pixel sub-components on which at least a portion of the stem of the text character is displayed have gray scale luminous intensity values between completely off and completely on.

18. The method of claim 17, wherein the gray scale luminous intensity value of each of said at least some of the pixel sub-components is generated as a function of the portion of a body of the character that is included within an area represented by the different set of one or more of the samples that is mapped to the particular pixel sub-component.

19. A computer program product for implementing, in a computer system including a processing unit and a display device for displaying an image, the display device having a plurality of pixels, each including at least three pixel sub-components each of a different color, a method for displaying an image on the display device with sub-pixel precision, the computer program product comprising:

a computer-readable medium carrying computer-executable instructions for performing the method, wherein the method includes:

obtaining samples of information representing an image;

mapping different sets of one or more of the samples to individual pixel sub-components of the plurality of pixels of the display device, the individual pixel sub-components being separately controllable; and using the different sets of one or more of the samples, displaying the image on the display device, such that each of the pixel sub-components of the plurality of pixels represent different portions of the image, thereby displaying the image on the display device with sub-pixel precision.

20. The computer program product of claim 19, wherein:

the display device is a liquid crystal display device having an arrangement of pixel sub-components that forms stripes on the liquid crystal display device of same-colored pixel sub-components;

the image includes a text character; and the different sets of the samples are mapped to the individual pixel sub-components of the plurality of pixels of the display device such that a stem of the text character is displayed having a stem width that is not an integer multiple of the width of a full pixel.

21. The computer program product of claim 20, wherein at least some of the pixel sub-components on which at least a portion of the stem of the text character is displayed have gray scale luminous intensity values between completely off and completely on.

22. The method of claim 1, wherein the sets of one or more of the samples are spatially different one from another.

23. The method of claim 12, wherein the sets of one or more of the samples are spatially different one from another.

24. The computer program product of claim 19, wherein the sets of one or more of the samples are spatially different one from another.

* * * * *